United States Patent [19]
Coleman

[11] Patent Number: 5,708,828
[45] Date of Patent: Jan. 13, 1998

[54] SYSTEM FOR CONVERTING DATA FROM INPUT DATA ENVIRONMENT USING FIRST FORMAT TO OUTPUT DATA ENVIRONMENT USING SECOND FORMAT BY EXECUTING THE ASSOCIATIONS BETWEEN THEIR FIELDS

[75] Inventor: J. Todd Coleman, Austin, Tex.

[73] Assignee: Reliant Data Systems, Austin, Tex.

[21] Appl. No.: 450,040

[22] Filed: May 25, 1995

[51] Int. Cl.$^6$ .................................................. G06F 7/00
[52] U.S. Cl. .................. 395/785; 395/500; 395/885
[58] Field of Search ............................ 395/500, 200.17, 395/200.18, 831, 850, 883, 885, 890, 894, 785, 800, 707, 604, 886

[56] References Cited

U.S. PATENT DOCUMENTS

| | | | |
|---|---|---|---|
| 5,261,080 | 11/1993 | Khoyi et al. ........................... | 395/500 |
| 5,339,434 | 8/1994 | Rusis ................................... | 395/200.18 |
| 5,410,675 | 4/1995 | Shreve et al. ......................... | 395/500 |
| 5,493,671 | 2/1996 | Pitt et al. ............................. | 395/500 |
| 5,524,253 | 6/1996 | Pham et al. .......................... | 395/800 |

*Primary Examiner*—Moustafa M. Meky
*Attorney, Agent, or Firm*—Conley, Rose & Tayon; Jeffrey C. Hood

[57] ABSTRACT

A data conversion system and method which converts data between different software and hardware platforms. The DCLE of the present invention converts data from any number of different types or formats from any of various platforms to a single common data standard having a pre-defined generic data type, and the data is then converted from this generic type to a new desired format or type and stored on an existing or new destination platform. Thus, the system and method of the present invention allows for multiple database conversions to be created easily and efficiently. The data conversion process begins by first defining a complete data map of the input and output data environments, as well as zero or more intermediate environments. Data objects referred to as data bridges and streams are created to logically connect or associate the input and output environments as well as the tables in the input and output data environments. In response to user input, the data conversion system and method creates an association between fields or parts in the tables (units) in the input environment and the fields in the output environment. This essentially involves creating user specified mappings between fields in the input data environment and fields in the output data environment. When an execute command is received, the data conversion system and method accesses data from the first input environment, i.e., accesses data from the storage medium storing the data to be converted, and converts the data from the first input data environment to data having a pre-defined generic data type. Converting the data first to a pre-defined generic data type greatly simplifies the conversion process, since conversion code is only required to and from the generic data type and is not required between every possible data format. Thus, the development of conversion code is much simpler and more efficient. Once data has been converted to the generic data object, the associations are executed to convert the data from the pre-defined genetic data type to the output data using the second data format.

25 Claims, 8 Drawing Sheets

SYSTEM FOR CONVERTING DATA FROM INPUT DATA ENVIRONMENT USING FIRST FORMAT TO OUTPUT DATA ENVIRONMENT USING SECOND FORMAT BY EXECUTING THE ASSOCIATIONS BETWEEN THEIR FIELDS

FIELD OF THE INVENTION

The present invention relates to methods for converting data between different formats, and more particularly to a data conversion language/engine which can be adapted to convert data from any of a number of first formats to any number of second formats.

DESCRIPTION OF THE RELATED ART

The information systems (IS) departments of many corporations and business organizations have undergone radical change in recent years, including downsizing, rightsizing, or restructuring/reengineering. One component of this change has been the need for companies to perpetually upgrade their hardware, software, and data storage systems. Many corporations currently store data in legacy mainframe systems in the same manner as when the system was purchased, decades ago. However, as the data storage paradigm moves from mainframe storage systems to more cost-effective platforms, such as PC-based client-server systems, businesses with decades worth of archived business-dependent information stored in mainframe systems have faced difficulties in moving to PC-based client-server systems. In general, moving data between systems having different data storage formats, for example, from mainframe systems to PC-based client-server systems, is a very difficult, time-consuming task, which can take months or even years to complete and all too often fails before any of the promised cost savings are realized.

Therefore, the process of data conversion, i.e., the process by which a large amount of information is moved from one informational system platform to another, has been very difficult. Today, corporations and other organizations process a large amount of transactions on any given day, including transactions related to financial reports, sales and accounting, human resources and personnel, or manufacturing and production. In general, information storage and information flow within an organization or business is very important to the success and well being of the business. As a result of the downsizing and corporate reengineering trends mentioned above, and due to the importance of information to a business or organization, Information systems and software processes are a prime target for corporate reengineering. This has traditionally involved converting data from large, mainframe-based systems to more cost-effective PC-based client server systems.

One difficulty in converting data between systems is that different data storage hierarchies are used in different systems. For example, mainframe systems use a hierarchical data storage method, whereas client-server systems use a relational database storage method. In addition, there are a large number of different data formats used in various systems.

One data conversion method that has been used historically can be referred to as the straightforward brute force method of data conversion. For this task, a core team of programmers is assembled for the sole purpose of creating one or more custom built programs from the ground up that will translate information from the platform currently in use to the format required by the destination platform. This process is time-consuming, cost-prohibitive and, more often than not, results in failure. This process also requires the use of highly-skilled programmers. Further, due to the custom nature of the software, the software is extremely difficult to change as problems arise.

A second method of data conversion that has appeared more recently is an attempt to automate the processes utilized in the above "brute force" method. This method involves writing a "code-generating" program. According to this method, organizations use the skills of a programming team to develop a small engine capable of generating custom-built programs which perform the information transfer. In other words, a team of programmers creates a code-generating engine, and this code-generating engine can then be used to facilitate the development of custom-built programs to perform the information transfer. This method includes many of the drawbacks discussed above, and generally only automates the above "brute force" process. In essence, this method only removes a handful of the time and cost constraints which make the data conversion process a difficult task.

Applicant is aware of a company called Evolutionary Technologies, Inc. located in Austin, Tex. which sells a product referred to as the Extract Migration package which performs data conversions. Applicant believes that this company is using one of the prior art methods described above. Some of the drawbacks of the Extract product is that this product is not easily adaptable to new environments without detailed programming knowledge of those environments. Also, all environments must be pre-defined and written before use of the Extract Migration package. Applicant is also aware of a company called Prism Software which uses similar methods to that described above.

Therefore, an improved system and method for data conversion is desired to assist organizations in converting data between different hardware/software/application platforms.

SUMMARY OF THE INVENTION

The present invention comprises a data conversion system and method which provides a simpler and more cost-effective method for converting data between different software and hardware platforms. The data conversion system and method of the present invention comprises a data conversion language/engine (DCLE) which is a powerful, hardware-independent, multi-user engine which requires no custom programming code. The DCLE of the present invention converts data from any number of different types or formats from any of various platforms to a single common data standard having a pre-defined generic data type, and the data is then converted from this generic type to a new desired format or type and stored on an existing or new destination platform. Thus, the system and method of the present invention allows for multiple data base conversions to be created easily and efficiently.

The present invention comprises an object-oriented software system including a plurality of data objects which represent the data being converted as well as perform the data conversion between different platforms. The present invention includes an environment data object which refers to a collection of tables, generally from a single application or data store, that have been grouped together into a single file. The tables within an environment are data objects referred to as units. In general, a table comprises a plurality of records in various formats. The present invention further comprises a data mapping object for the fields of the records themselves. A record comprises a plurality of fields, and the present invention uses field definition data objects referred to as parts which define the inner workings of a record, i.e., the type, the size, and the format, etc. of each field in a record.

The data conversion system and method preferably executes on a general purpose computer. The computer is preferably connected to the source storage medium storing the input data and a destination storage medium where the output data is to be stored. It is noted that the source and destination storage mediums can be the same medium. A user can either directly use the computer executing the data conversion system and method, or the user can remotely connect to the DCLE application.

The data conversion process begins by first placing the data to be converted into a form usable by the conversion engine. This step can have many different variations. The present invention makes the following assumptions regarding input data. First, since environments can only be bridged in a one to one or a one to many relationship, all input data destined for a single output environment is grouped in a single file. Secondly, all like records are grouped together into separate tables and have table delineations.

The first step in the data conversion is creating and defining input and/or output environments for the data within the DCLE engine. The user first defines a complete key map or data map of the data to import exactly as the DCLE engine must read the data from the data store file. This process begins by declaring all imported tables. The user then details these tables or units by declaring the data fields or parts that define each of the individual table's records. Once this process is completed, a completely defined input data file has been created. The user also defines a complete data map of the output data environment, i.e., defines the tables and parts of the data format of the output environment. It is noted that the only difference between the creation of input environments and output environments is the conceptual notion that the input environment is defined by the format of the data to be converted, whereas the data formatting fields of the output environment are created by the user based on his desires.

Depending upon the complexity of changes to the data hierarchy itself, i.e., the arrangement and relationship of the units and parts between the different formats to be converted, one or more intermediate output environments may be created. Intermediate output environments are used for a variety of reasons including, first, to simplify the migration process itself by separating the process into smaller, more workable parts; second, to move a single store of imported data to multiple data base output files or even multiple different data base platforms; and third, to parse records into different output files for loading into separate databases or even separate database platforms. Intermediate output environments behave identically to normal output environments, and the process used to declare or create an intermediate output environment is identical to the process used to create input or output environments described above.

In order to logically connect the input data environment and the output data environment, an object referred to as a data bridge is created to logically connect or associate the environments in a one-to-one or one-to-many relationship. Bridges can be created between an input environment and one or more output environments or between an input environment and one or more intermediate environments. Bridges can also be created between an intermediate and one or more output environments. Bridges can only have a one-to-one or one-to-many mapping relationship.

A user then enters logical associations between tables in the input and output data environments, and the data conversion system and method creates a logical association between tables in the respective input environment and tables in the respective output environment. These logical associations are referred to as a stream data objects. Unlike bridges, streams can form any relationship between input and output tables or units including one-to-one, one-to-many, many-to-one, and many-to-many.

In response to user input, the data conversion system and method creates an association between fields or parts in the tables (units) in the input environment and the fields in the output environment. This essentially involves creating user specified mappings between fields in the input data environment and fields in the output data environment. The user enters a plurality of commands referred to as MapTo commands, and these commands specify the mappings between fields or parts of tables. The MapTo command used in the present invention preferably follows similar guidelines to the syntax of an industry accepted standard transact SQL "select" statement.

MapTo commands or associations are used to create different types of associations between fields or parts of individual units in respective environments. In addition to creating mappings between fields or parts, the MapTo command can also be used to create mathematical, logical, or conditional associations or statements.

Mathematical associations are created to perform mathematical manipulations or mathematical operations on fields or multiple fields. Logical associations are used to place logical true or false values into an output field based on a logical comparison that is performed. Conditional logic is used to evaluate one or more logical comparisons and then perform certain operations based on the result. One example of the use of a conditional association or statement is to input certain values into an output table only if certain logical assumptions are true.

Therefore, from high to low level, bridge data objects are used to connect input data environments and output data environments. Streams comprise a subset of bridges and are used to connect individual tables or units in their respective input and output data environments. The data mappings or MapTo commands are a subset of each stream and represent the mapping themselves between fields or parts.

When the above steps have been completed, the data conversion system and method has received essentially all the information required to begin a data conversion. The data conversion system and method then receives an execute command from a user to perform an indicated data conversion. In response to the execute command, the data conversion system and method accesses data from the first input environment, i.e., accesses data from the storage medium storing the data to be converted, and converts the data from the first input data environment to data having a pre-defined generic data type. Converting the data first to a pre-defined generic data type greatly simplifies the conversion process, since conversion code is only required to and from the generic data type and is not required between every possible data format. Thus, the development of conversion code is much simpler and more efficient.

The Generic data object comprises a block of memory which stores data of any type using one or more pre-defined format fields. In the preferred embodiment, the Generic data object comprises a Store field and a Type field for each piece of data, and a new instance of the Gdata object is created for each piece of data. The Store field is a buffer or segment of memory which stores the information portion of the data, and the Type field stores the type of the data. For example, if the data being converted is a Social Security number, the Store field stores the actual eight numbers comprising the Social Security Number, and the Type field stores the data type, in this case an integer data type. In the preferred embodiment, the Type field stores a numerical value which indexes into a list of types. Thus, a single instance of a Gdata object comprises a single data store and a single type field corresponding to that store.

Once data has been converted to the generic data object, the associations or MapTo commands are executed to convert the data from the pre-defined generic data type to the output data using the second data format. Execution of the MapTo commands comprises, for each table in the output data environment and for each stream to a respective table in the output data environment, performing a data conversion for each of the MapTo commands pointing to the respective output table for all of the streams to the respective output table. Once the MapTo commands have been executed, the data is converted to the new desired format. The converted output data is stored in a destination medium. It is noted that this destination medium may be the same medium on which the input data was stored or may be a new medium.

Therefore, the present invention comprises an improved system and method for converting data between different formats or types. The present invention converts data to a pre-defined generic data object or generic data type and then converts data from this generic type to the new format. This simplifies the conversion process.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
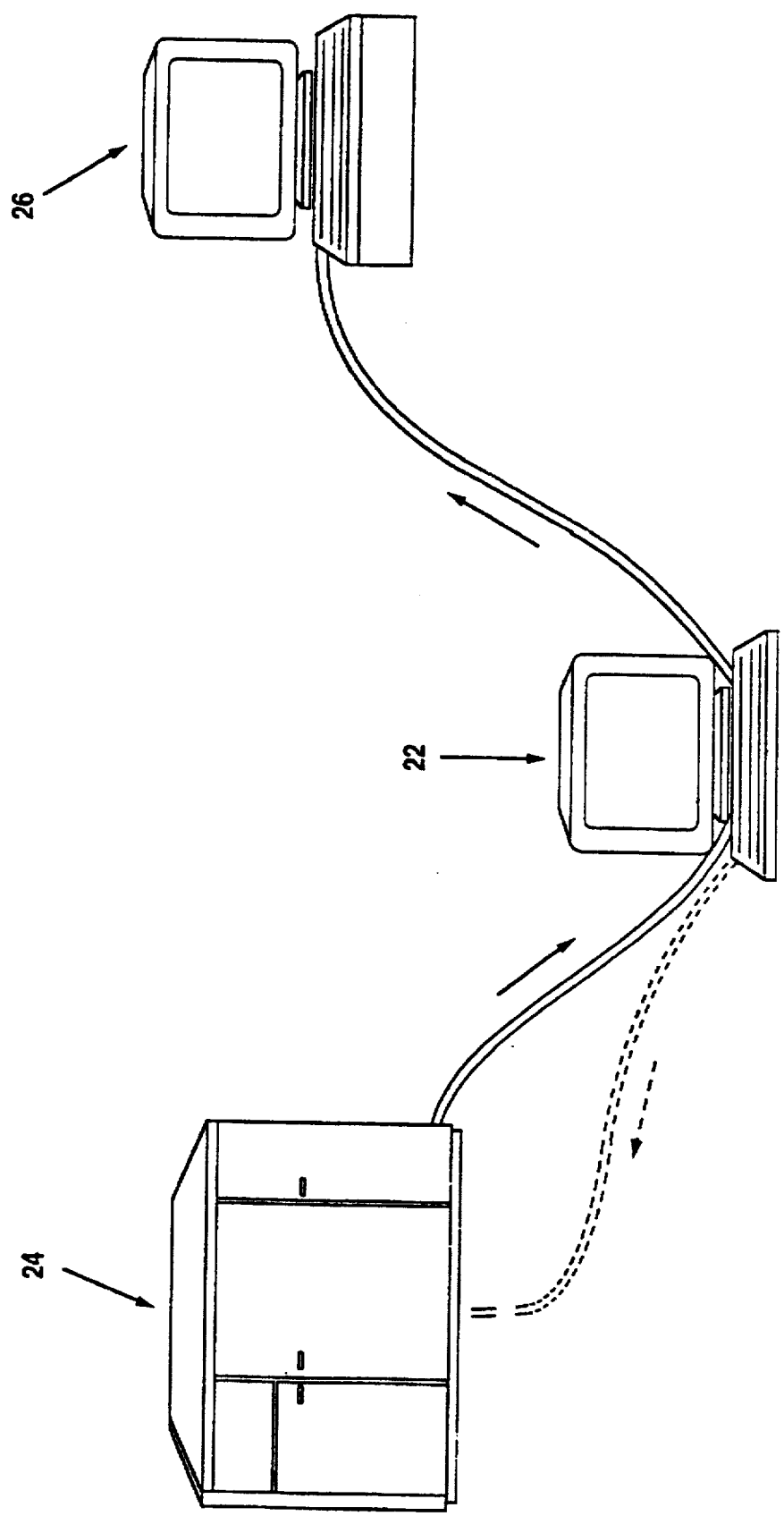
FIG. 1 illustrates the data conversion system and method executing on a computer system to convert data from a first storage medium to a second storage medium.

Referring now to FIG. 1, the data conversion system and method of the present invention is preferably executed on a general purpose computer system. The present invention is used to convert data stored on a first storage medium 24 in a first data format to a second storage medium 26 in a second data format, possibly located on the same physical computer system. The data conversion system and method is also referred to herein as the "data conversion language engine" or DCLE. As used herein, the term "data format" means any of various configurations or arrangements of data, including data types, among others.

It is noted that the present invention not only performs conversions between different data types, but rather the present invention can also be used to perform conversions of the file formats, the headers and the footers of the file itself, as well as other conversions, as desired. Thus the present invention performs a plurality of different conversions other than, or in addition to, converting the data between data types. For example, the present invention can be used to convert a record having 5 fields to a record having 4 fields, or a record having 1 field, or a record having 7 fields. The present invention can be used to convert a record having 5 fields to a record having 5 fields but changing the data types of one or more of the records, or changing the delimiters, i.e., placing commas in between the fields, or adjusting the formatting, such as text formatting, placing "enters" in the data so that the data appears differently, etc.

As shown in FIG. 1, the computer system 22 executing the data conversion system and method of the present invention first receives input data from a user regarding the formats of the input and output data. The present invention then accesses the data in the first data format on the first storage medium 24 and provides the converted data to the second storage medium 26, wherein the converted output data has the second data format. FIG. 1 is an illustrative example only and shows conversion from a mainframe computer system 24 to a PC-based system 26. However, it is noted that the data conversion system and method of the present invention may be used when converting data from many of various storage mediums having any of various data formats to any of various output storage mediums also having any of various data formats. It is also noted that the first and second storage mediums may be the same medium, i.e., the data conversion system and method executing on the computer 22 can read data from the storage medium 24, convert the data to a new format, and then output the converted data back to the same medium, i.e., the medium 24, as shown by the dotted line between the computer 22 and the computer 24.

In one embodiment of the invention, a user enters various information into the computer 22 and then executes the data conversion system and method to perform the data conversion. In an alternate embodiment, one or more users may be at various remote locations from the computer 22 and can access the computer 22 via Internet or TCP/IP connections to access the data conversion system and method executing on the computer system 22. Also, it is noted that the computer systems 22 and 26 may be the same computer system.

It is also noted that the present invention may be used to convert data between any of various types of formats. For example, the data conversion system and method of the present invention can be used to convert data from a database in a first data format to a database having a second data format. Alternatively, the present invention may be used to convert video data having a first compressed format to video data having a second compressed format. Various other types of data format conversions can be performed using the present invention.

The data conversion system and method is a multi-user, object-oriented migration engine which converts or moves massive amounts of information between dissimilar platforms. The DCLE system of the present invention offers true multi-platform design capabilities, allowing conversion of a legacy mainframe data to any modern relational database management system (RDBMS), or from any RDBMS to any mainframe platforms such as HP9000 running INFORMIX, or custom applications can be connected to the platform of choice. The present invention may also be used to convert data to a non-platform basis for data warehouse usage. Batch automation allows for hands-free data conversion on a nightly, weekly, or yearly basis—also perfectly suited for data warehousing.

The data conversion system of the present invention is preferably configured to operate with a variety of platforms, including Oracle, Sybase and other major RDBMS. The present invention preferably includes interfaces to the DCLE for Xwindows/Motif, MS Windows, OS/2, DOS, and UNIX. In the preferred embodiment, the data conversion system comprises a UNIX engine capable of converting and manipulating massive amounts of information. Alternate embodiments use MS Windows or OS/2 based engines, as desired. The present invention further includes multi-user socket functionality coupled with object-orientated application development, and also includes full security at both the user and object level to allow for complete protection of both environment and data. The present invention includes batch automation suited for both two and three tiered environments. Also, the data conversion system can be continually changed or modified according to the desired migration process, and is easily adaptable to new environments without detailed programming knowledge of those environments.

Figure 2A:
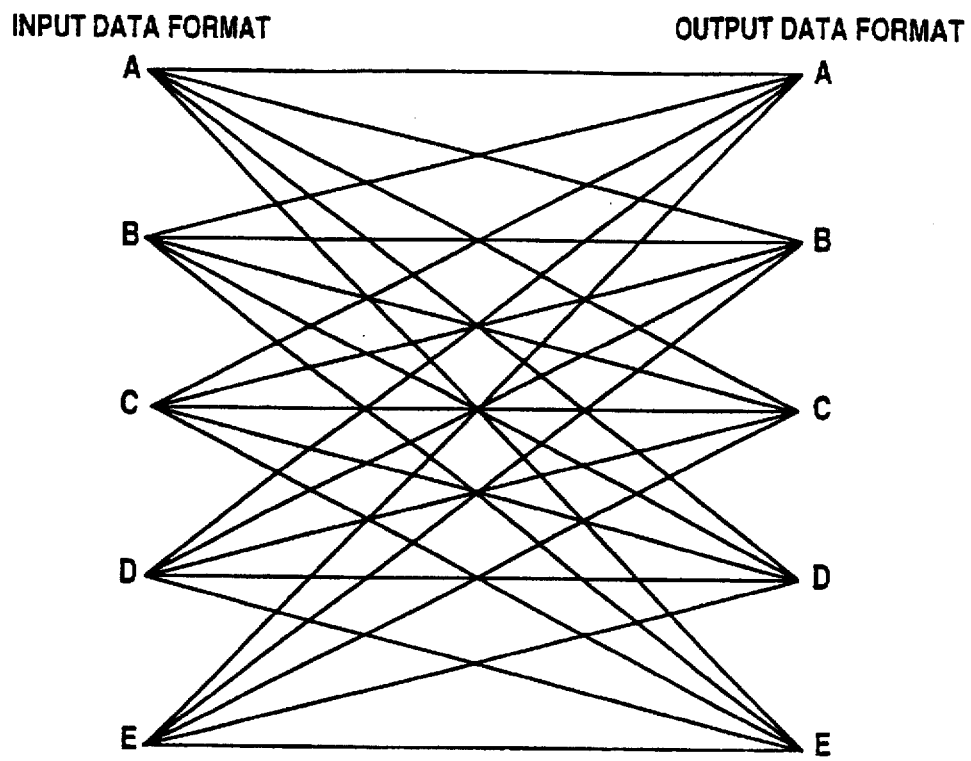
FIG. 2A illustrates data conversions between different input and output data formats using prior art methods.

FIG. 2A illustrates prior art data conversion methods which assume a plurality of input platforms on the left labeled A, B, C, D, E, and a plurality of output platforms also labeled A, B, C, D, E, as shown. As discussed in the background section, prior art methods require custom conversion code to perform conversions between each input data platform and each output data platform having different formats. Thus, a developer would have to create a complete library of programs, one for each combination of source and destination databases having different formats.

Figure 2B:
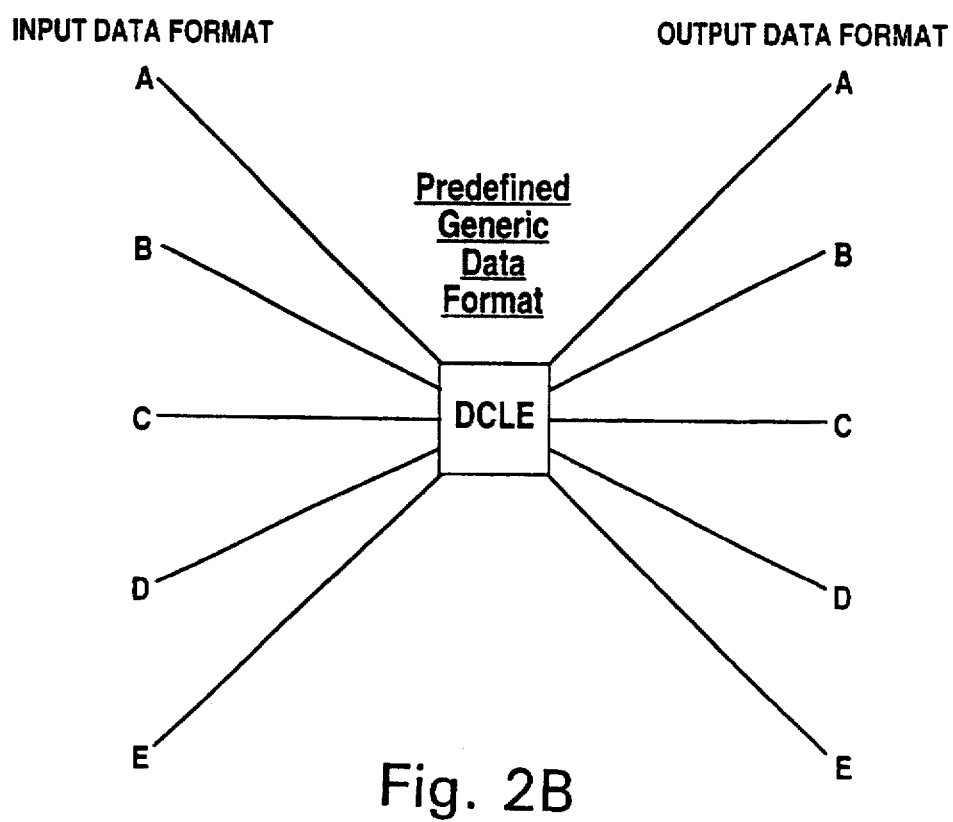
FIG. 2B illustrates data conversions between different input and output data formats using the data conversion system and method of the present invention.

As shown in FIG. 2B, the present invention converts data from any of various different types of input data formats to a common pre-defined generic data format. Once the data has been converted to this common generic data format, the data is then converted to the desired output data format as shown. This greatly simplifies the data conversion method and allows for multiple data base conversions to be created easily and more efficiently.

Data Conversion Method

In order to perform data conversion between data having different formats, the input and output data are broken down into their respective component parts. The present invention uses a plurality of data objects which represent the input and output data. The term "environment" is used herein to refer to the respective data, i.e., to the input data and to the output data. More specifically, the term "environment" refers to a collection of tables normally from a single data store or application that are grouped together in a single file. The tables within an environment are referred to herein as units. A table comprises a plurality of records of data wherein each table has a different record format. According to the present invention, table-to-table conversions can have any of four mapping relationships including one-to-one, one-to-many, many-to-one, and many-to-many. A table or unit can be defined simply as a collection of like records, i.e., a collection of records of like type. One example of a table would be an employee's name, social security number, salary, date of birth, etc. The present invention also includes a data mapping object for records which utilize this field definition referred to herein as parts. Parts define the actual interworkings of a record, i.e., the type, the size, and the format of a respective record. In the example described above, the parts of the above employee data record would be the name field, the social security number field, the salary field, the date of birth field, etc.

The data conversion system and method of the present invention makes certain assumptions regarding the input data. First, the present invention assumes that since environments are only bridged in a one-to-one or one-to-many relationship, all input destined for a single output environment is grouped in a single file. The system and method of the present invention also assumes that all like records are grouped together in separate tables and the input file includes a table delineation.

In order to begin the data conversion process, a user is first required to input information regarding the input data in input data format and the desired output data format for the converted data. In a system where the user is remote from the computer system 22 where the present invention is executing, the user first connects to the system. The user can connect to the system in various manners including a TCP/IP connection utilities using a simple VT-100 style terminal connection program such as Telnet or UNIX Host Presenter or other types of connection methods. Once a connection has been made to the computer system 22 executing the data conversion system and method, the user is then queried for the account name and password. If the user enters the correct values, the user then may access the command interpreter of the system and may begin work. Alternatively, if the user is physically located at the computer system 22 executing the data conversion system and method of the present invention, the user simply logs on and optionally enters an account name and/or password before beginning operation.

Figure 3:
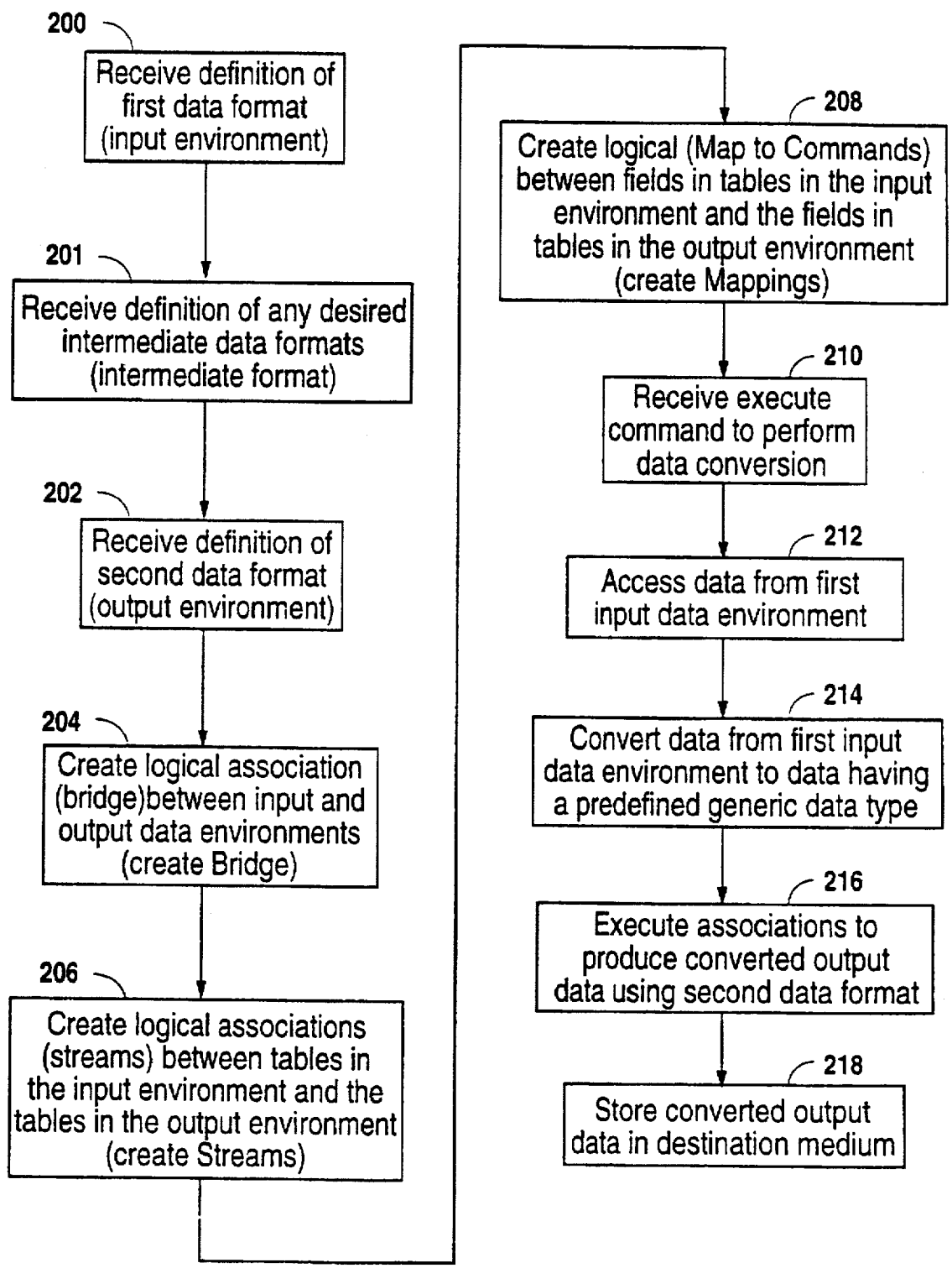
FIG. 3 is a flowchart diagram illustrating operation of the data conversion system and method of the present invention.
Figure 4:
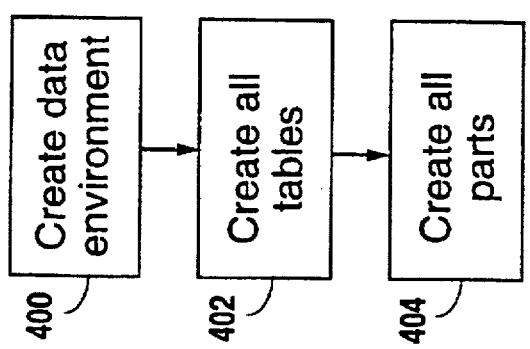
FIG. 4 illustrates the steps involved in creating a data environment as shown in FIG. 3.

Referring now to FIG. 3, the dam conversion method is shown. In step 200, the system receives a user specified definition of the first data format, i.e., of the input environment where the data to be converted is stored. In other words, here the user enters information regarding the units and parts (tables and fields) of the input data. FIG. 4 illustrates more detail regarding the creation of a data environment. As shown, creation of a data environment in step 400 includes specifying (or creating) all tables or units in step 402 and specifying (or creating) all fields or parts in step 404. Thus, here the user specifies the data format of the input environment including all of the tables or units and all of the parts or fields of the respective records in each of the respective tables.

In creating the initial input environment, the user enters a command similar to the following:

MKENV INPUT

This command is used to begin the creation of the input environment. Commands are entered either through physical keyboard entry, or a GUI (graphical user interface) point and click command, or creating a batch command and uploading the command in the DCLE engine.

The user also defines, from the ground up, a complete key or data map of the input data exactly as the conversion system must read the data from the data store file. This process begins by declaring imported tables using commands similar to the following:

This process begins by declaring all imported tables using commands similar to:

MK UNIT INPUT:TABLE 1

MK UNIT INPUT:TABLE 2

MK UNIT INPUT:TABLE 3

MK UNIT INPUT:TABLE N

The user then details these tables or units by declaring the data fields or parts that define each of the individual table's records. This step uses commands similar to the following:

MK PART INPUT:TABLE 1:PART 1

MK PART INPUT:TABLE 1:PART 2

MK PART INPUT:TABLE 1:PART N

Once this process is completed, a completely defined input data file has been created.

It is noted that the user can save his work in this environment by using the command:

SAVE ENV OUT

Also, if the user desired to leave the session and reopen it later, the commands upon reentry would be:

LOAD ENV INPUT

LOAD ENV OUTPUT

Optionally, the user could place both environments in a work file. The commands to add and remove items from the work file are:

ADD WK INPUT.ENV

ADD WK OUTPUT.ENV

RM WK INPUT.ENV

RM WK OUTPUT.ENV

In addition, the user can load all of the items presently listed in the work file by simply using the command LOAD WK. A command referred to as SHOW WK is used to show the work file and is used if the user is unsure of the objects currently in the work file.

It is also noted that the input data format may be defined by a data dictionary associated with the input data environment. In this embodiment, the definition of the first data format is received by receiving the data dictionary of the first data format and then converting the data dictionary into a definition of the first data format useable by the data conversion system and method.

In step 201, the data conversion system and method receives a definition of any desired intermediate data formats, i.e., any desired intermediate environments. In some data conversion applications, it may be undesirable and/or impractical to perform a full conversion between the source or input data environment and the destination or output data environment. In these situations, it may be easier to create one or more intermediate data environments where the input data is converted first to the intermediate data environment and then converted from the intermediate data environment to the output data environment. Thus, depending upon the complexity of changes to the data hierarchy itself, i.e., the arrangement and relationship of the units and parts between the different formats to be converted, one or more intermediate output environments may need to be created.

Intermediate output environments are used for a variety of reasons including, first, to simplify the migration process itself by separating the process into smaller, more workable parts; second, to move a single store of imported data to multiple data base output files or even multiple different data base platforms; and third, to parse records into different output files for loading into separate data bases or even separate data base platforms. Intermediate output environments behave identically to normal output environments. The only difference between a normal output environment and an intermediate output environment is that an intermediate output environment is used after execution as the input environment for another execution later on in the conversion process. The process used to declare or create an output environment or an intermediate output environment is identical to the process used to create input environments described above. The primary difference between the creation of input environments and output environments is the conceptual notion that the input environment is defined by the format of the data to be converted, whereas the data formatting fields of the output environment are created by the user based on his desires.

Therefore, in step 201, if the user desires to use one or more intermediate data environments in the data conversion process, the user enters information regarding the respective intermediate environments and units and parts for each of the respective intermediate environments. These definitions are received by the system in step 201. It is noted that the creation of intermediate environments is optional depending upon the user's application.

In step 202 the data conversion system and method receives a definition of a second data format—in this example, the data format for the output environment. This involves the user entering information regarding the output or destination environment, including the desired tables that the output environment will have as well as the parts or fields for each of the respective tables. This step is discussed in greater detail with respect to FIG. 4. It is noted that the creation of data formats does not require that the format be specified as an input format or an output format. Rather, once a data format environment has been created, this data format environment can be used as either an input, intermediate, or output data format.

After steps 200, 201 and 202 have completed, the data conversion system and method has received the full information regarding a fully defined data migration or conversion process from an initial input environment to one or more output environments and including one or more intermediate environments as desired.

Create Bridge Object

In order to logically connect or logically associate the input data environment and the output data environment, an object referred to as a data bridge is created to connect the environments in a one-to-one or one-to-many relationship. Bridges can be created between an input environment and one or more output environments or between an input environment and one or more intermediate environments. Bridges can also be created between an intermediate and one or more output environments. Bridges can only have a one-to-one or one-to-many mapping relationship. The command to create bridges between environments is:

CREATE BRIDGE[INT ENV][OUT ENV]

As shown in step 204, a bridge essentially comprises a logical association between first and second environments— in this example between input and output data environments. A bridge can also be created between input and intermediate data environments, between intermediate and intermediate data environments and intermediate and output data environments.

When a bridge object is created, i.e., when a logical association is created between environments, the data conversion system creates pointers to the two environments. A bridge object includes a pointer to the first environment and a pointer to the second environment, and also includes a pointer to a linked list of the respective streams between the two environments.

Create Stream Objects

In step 206, in response to a user entering logical associations between tables in the input and output data environments, the data conversion system and method creates a logical association between tables in the respective input environment and tables in the respective output environment. These logical associations are referred to as a stream data objects. The command to create a stream between input and output tables is:

CREATE STREAM[IN:TABLE][OUT:TABLE]

Unlike bridges, streams can form any relationship between input and output tables or units including one-to-one, one-to-many, many-to-one, and many-to-many. The bridges and streams created in steps 204 and 206 are essentially logical connections between data areas, and it is noted that no information at the record level has been specified for conversion.

When a stream object is created, i.e., when a logical association is created between tables or units, the data conversion system creates a pointer to the respective source and destination tables. A stream object includes a pointer to the respective bridge, a pointer to the source table, a pointer to the one or more destination tables, and also includes a pointer to a linked list of the respective MapTo commands within the respective stream object.

Create MapTo Commands

In step 208, in response to user input, the data conversion system and method creates an association between fields or parts in the tables (units) in the input environment and the fields in the output environment. Therefore, step 208 essentially involves creating user specified mappings between fields in the input data environment and fields in the output data environment. In step 208, the user enters a plurality of commands referred to as MapTo commands and these commands specify the mappings between fields or parts of tables. The MapTo command used in the present invention preferably follows similar guidelines to the syntax of a transact SQL "select" statement. As is well known, the transact SQL select statement is the backbone of all SQL servers, examples of which include Sybase, oracle, INFORMIX, ingres, etc. The format of a transact SQL select statement is as follows:

```
SELECT INTO <output>_table> : <(dest_var1, dest_var2, dest_var3, ..., dest_varN>
FROM <input_table> : <src_var1, const 12345, src_var3, ..., src_varN>
WHERE <src_varx || constant> <operator> <src_vary || constant>
    <<operator> <another expression as above>>
    < ... ad infinitum ... >
```

The MapTo command according to the system and method of the present invention is similar to the above SQL select statement and is as follows:

```
MAP10 <outenv:outtable> {dest_col1, dest_col2, dest_col3, ...,
dest_colN>
FROM <inenv:intable> {src_var1, const 12345, src_col3, ...,
src_colN>
WHERE <src_varx || constant> <operator> <src_vary || constant>
    <<operator> <another expression as above>>
    < ... ad infinitum ... >
```

Thus, the core of every command has 3 distinct parts.

MAPTO part: this part details the destination of the information processing

<outenv:outtable> this tells you where the bridge/stream attaches on the destination side.

<dest_column list> this list is preferably comprehensive, i.e., there is preferably a column in this list for every column in the output table. If not, then for each record, columns not included will be populated with NULLS or 0.00's. The order of this list is unimportant, except that it must match the list on the input side, i.e., the FROM part of the MapTo statement.

FROM part: this part details the source side of the information processing.

<inenv:intable> this indicates where the bridge/stream attaches on the source side.

<Src_column list> this list need not be a complete list of all variables present in the source_env:source_table, but simply a comprehensive list of all variables the user desires to transfer into the destination table. The order of these variables destination side will be filled with the value of the first input column or the first constant provided in the FROM section <src_column list>. Note: Expressions are also allowed within the src column list, so that if the first column of the destination list were a string called 'Column1' then the following would be acceptable examples of items to place as the first element of the FROM <src_column list>:

```
FROM <inenv:intable>in_column1
    'Test Column'
    '12345'
    (in_column1 + in _column2)
    ('AAA'='bbb')
    /*this last would enter the
    string 'FALSE'*/
```

Where Part: The where section is the conditional logic section of this MapTo statement, i.e., for each record processed by this MapTo statement, only perform the mapping if this WHERE statement is evaluated to be TRUE.

<src_varx||constant><operator><src_varx||constant> this is a standard expression, and may be coupled with other expressions using standard parenthetical operators to result in a final evaluation of either TRUE or FALSE. Whenever TRUE, the MapTo command will proceed with the mapping as specified in the MapTo and FROM sections of the statement, and when FALSE, this record will be skipped and no action will be taken. Note: The where section is optional. If the intention of the user is to migrate every record of the input table to the output table, with no conditions whatsoever, then the WHERE statement and all of its component parts can be eliminated from the MapTo command entirely.

MapTo Associations

MapTo commands or associations are used to create different types of associations between fields or parts of respective environments. In addition to creating mappings between fields or parts, the MapTo command can be used to create either mathematical, logical, or conditional associations or statements.

Mathematical associations are created to perform mathematical manipulations or mathematical operations on fields or multiple fields. For example, mathematical associations are used to multiply certain fields by certain values to obtain new data, such as multiplying a salary field times a constant or another field within the record, or adding a certain value to the salary to obtain a new value for the salary to be placed in the output table.

Logical associations are used to place logical true or false values into an output field based on a logical comparison that is performed. For example, if the user desires to fill in a string or Boolean field on the output side with the values 0 or 1 or true or false, the result of the logical association would place a TRUE or FALSE value in the field. One example of a logical association is "Sex=Male". The output of this association is a 1 or true value if the field of the record being examined indicates a male. If not, then it would enter a 0 or false value in the field. A logic association or statement differs from a conditional statement because a mapping is performed regardless of the result of the comparison, i.e., for this record a value will be placed into the field of the respective output table. The only question is whether a true or false, or 0 or 1, will be placed based on this logical equation.

Conditional logic is used to perform a logical comparison and then perform certain operations based on the result. One example of the use of a conditional association or statement is to input certain values into a output table only if certain logical assumptions are true. A specific example is, if number of years employed is greater than X, then map name, street, address to the respective table. Thus, conditional logic allows a user to create an association that doesn't necessarily populate for every record on the input side to the output side, but rather only the ones that fulfill the specified criteria.

The data conversion system includes a parser/map engine including an expression parser. The expression parser or engine examines expressions such as $(((3+X)\times 4)$ or sign true)$\times 50)>=30$ and returns a true or false value, depending on the values of X or Y or whatever variables are included in the expression. The expression engine also executes expression and returns the appropriate values, such as $50\times 20+X\times 4$ divided by 30 times Y.

The map engine allows a user to include expression statements in MapTo commands. For example, if a user desired to multiply a salary value by a certain fraction to compute a raise, the user includes the appropriate mathematical expression in the MapTo command, and the map engine executes the expression. As another example, is a user were performing a data conversion and desired to compute stock options for key employees, the user would enter the appropriate expression which is then executed during the data conversion to compute the stock options. As another example, if the data being converted includes three classifications for a call center and it is desired that the output data have a much greater number of classifications for the call center, the user can include an expression including mathematical calculations on, for example, sales as a percentage of unit sold minus variable cost, wherein the result places data in a respective call center classification.

Therefore, from high to low level, bridge data objects are used to connect input data environments and output data environments. Streams comprise a subset of bridges and are used to connect individual tables or units in their respective input and output data environments. The data mappings or MapTo commands are part of each stream and represent the mapping themselves between fields or part and are created using MapTo commands as previously described.

When steps 200–208 have been completed, the data conversion system and method has received essentially all the information required to begin a data conversion. In step 210, the data conversion system and method receives an execute command from a user to perform an indicated data conversion. The format of the execute command is described below.

Data Conversion

In step 212, the data conversion system and method accesses data from the first input environment, i.e., accesses data from the storage medium storing the data to be converted. In step 214, the data conversion system and method converts the data from the first input data environment to data having a pre-defined generic data type. When an execute command is received, the input data is accessed, and the data conversion method immediately converts data from any of various data types including int, char, string, byte, float, packed, etc. to a generic data type. The generic data type is a defined object referred to as Gdata (generic data) and has the capabilities of storing information regardless of the original format of the input data. Thus the data conversion system and method of the present invention includes its own data type.

As described further below, conversion of data to the Gdata type comprises creating an instance of the Gdata object and storing the information portion of the data in a first field and storing the type information of the data in a second field. Converting the data fast to a pre-defined generic data type greatly simplifies the conversion process, since conversion code is only required to and from the generic data type and is not required between every possible data format. Thus, as shown in FIGS. 2A and 2B, the development of conversion code is much simpler and more efficient.

Systems which do not use a generic data type require a much greater mount of mapping code than the present invention. For example, consider 6 data types such as integer, character, string, byte, float, and packed. In order to convert from each of these data types to the other respective types, a program would have to be specifically developed for each conversion, such as integer to byte, integer to character, integer to string. Instead, the present invention uses a specific conversion to a pre-defined generic data type. Any data type can be converted to the generic data type, and the generic data can be converted to any data type. When it is desired to convert to or from a new data type, it is only necessary to create conversion code from the new data type to the generic data type and from the generic data type to the new data type. It is not necessary to create conversion code specifically for each data type to and from the new data type. This reduces the amount of coding substantially.

The step of converting the data from the first input data environment to data having a pre-defined genetic data type is discussed in greater detail with reference to FIGS. 5 and 6 below. Further, a source code listing is included with the present disclosure which further describes the operation of the genetic data (Gdata) object of the present invention.

In step 216, the associations created in step 208 are executed to produce converted output data using the second data format. Execution of these associations or MapTo commands converts the data from the generic data type to data having the second format. It is noted that steps 212-216 are essentially performed together, i.e., the respective data is accessed to convert it from the first input data environment to the pre-defined generic data type, and then the associations are executed to convert the data from the pre-defined genetic data type to the output data using the second data format. In step 218 the converted output data is stored in a destination medium. It is noted that this destination medium may be the same medium on which the input data was stored or may be a new medium.

Generic Data Object

Figure 5:
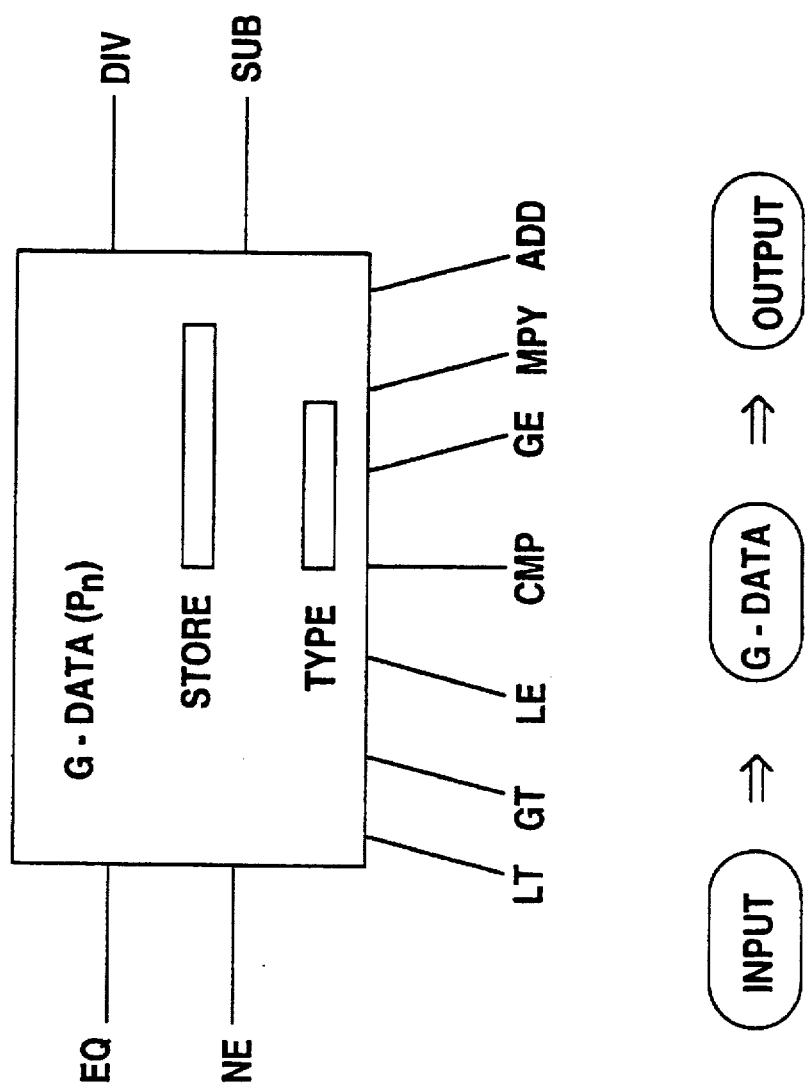
FIG. 5 illustrates structure of the generic data object.

Referring now to FIG. 5, the Gdata or Generic Data Type object accommodates or consolidates all of the possible data types, including, but not limited to, string, integer, float, byte, packed, decimal. Data of any type can be converted to or from the genetic data type, as desired.

In the preferred embodiment, the Gdata object is a standard block of memory which stores data of any type using one or more pre-defined format fields. In the preferred embodiment, the Gdata object comprises a single large buffer space including a "Store" field and a "Type" field. The Store field is a buffer or segment of memory which stores the information portion of the data, and the Type field stores the type of the data. For example, if the data being converted is a Social Security number, the Store field stores the actual eight numbers comprising the Social Security Number, and the Type field stores the data type, in this case an integer data type. In the preferred embodiment, the Type field stores a numerical value which indexes into a list of types. Thus, a single instance of a Gdata object comprises a single data store and a single type field corresponding to that store. In the preferred embodiment, a new instance of the Gdata object is created for each piece of data.

Various operators may be applied to the Gdata object, including Equal To (EQ), Not Equal To (NE), Less Than (LT), Greater Than (GT), Less Than/Equal To (LE), Compare (CMP), Greater Than/Equal To (GE), Multiply (MPY), Addition (ADD), Subtraction (SUB), and Division (DIV), among others. As shown at the bottom of FIG. 5, input data is first converted to the Gdata object, i.e., to the generic data format, and is then converted from the Gdata format to the output format.

In an alternate and less preferred embodiment, the Gdata object does not include a single "Store" field, but rather includes a plurality of "space-holders" or variables which are full or empty depending on the nature of the data type being converted. In one embodiment, the Gdata object includes a float space, an integer space, and a string space which is used for all of the information being converted of any data type. If the data type being converted is a string, the variable for string data types is created and contains data, if the data type being converted is an integer, the variable for integer data types is created and contains data, etc. Thus, in this embodiment, the Gdata object includes a plurality of variables within the object corresponding to different data types, and respective individual variables in the Gdata object are formed depending on the type of data being converted. It is noted that some of the variables are used for multiple data types. For example, the packed, fixed, and character data types are stored in the string variable or space. Also, the integer variable holds various types of variables, including short integers, long integers, etc.

Operator overwrites are included on the Gdata object to enable comparisons between the respective Gdata object and other Gdata objects. These operator overwrites allow various types of manipulations or operations on data in the Gdata object, allow comparisons and operations between different Gdata objects, and allow comparisons and operations between and among data in a respective Gdata object.

Figure 6:
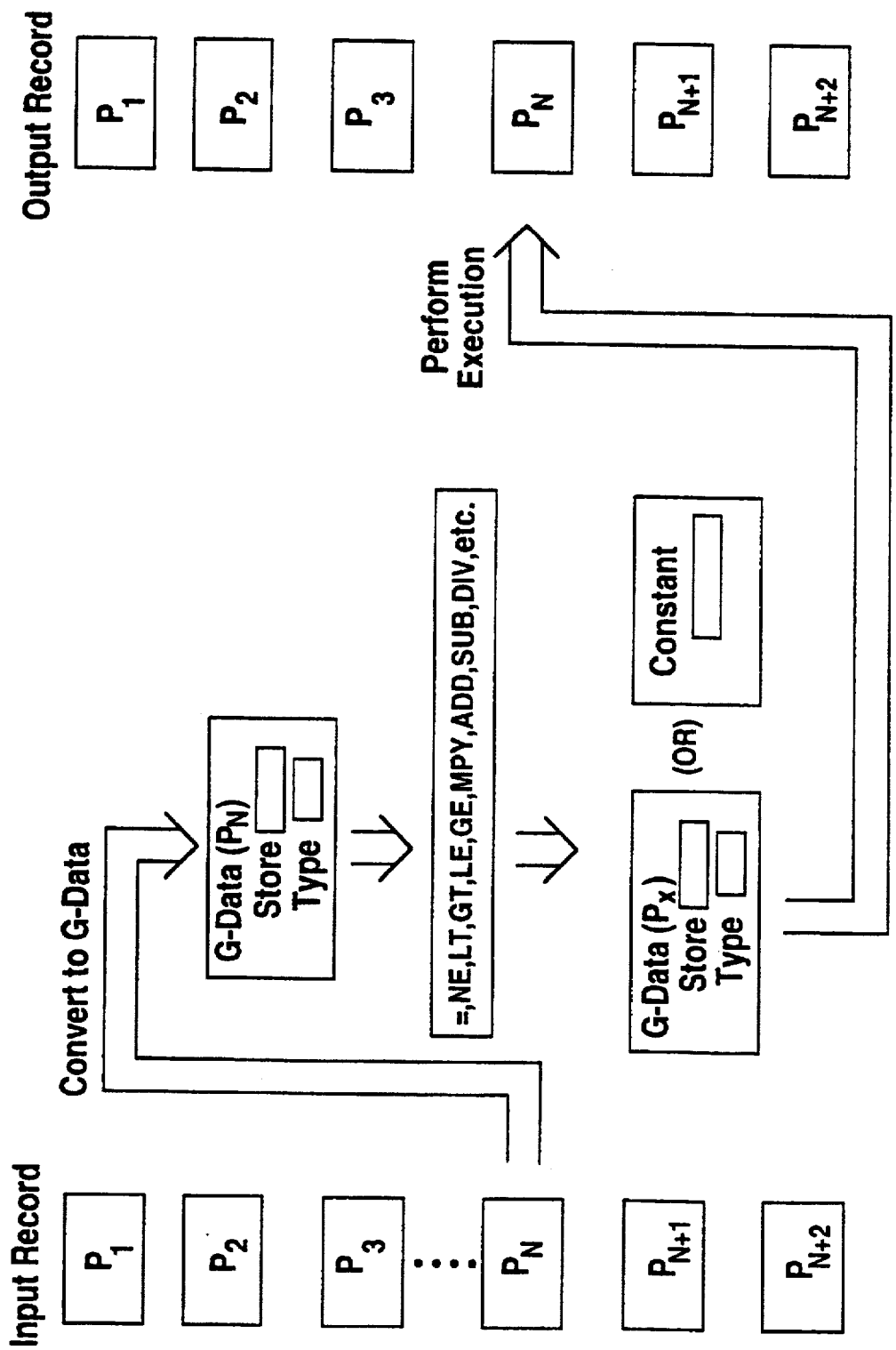
FIG. 6 illustrates the conversion of data from a first input data environment to data having a pre-defined generic data type and then to output data.

Referring now to FIG. 6, a diagram is shown illustrating the conversion of data from an input record to the Gdata format, and then from the Gdata format to output data. An input record comprises a plurality of parts, and the operations shown in FIG. 6 are performed for each input record part. As shown, an input record part such as part $P_N$ is first converted to the Gdata format. Conversion of input data to the generic data format comprises storing the "data" or "information" portion of the data in a Store field and storing the type information of the data in a Type field as described above.

Once the data has been converted to the generic data type, one or more operators are invoked on the data, depending on whether the user has specified operations on the data. In performing these operations, one or more Gdata objects or other constants may be called, as necessary. The MapTo executions are then performed to generate the output data in the correct output record part format.

A source code listing is included with the present specification to further describe the operation of converting data to the Gdata object.

MapTo Command Execution

Figure 7:
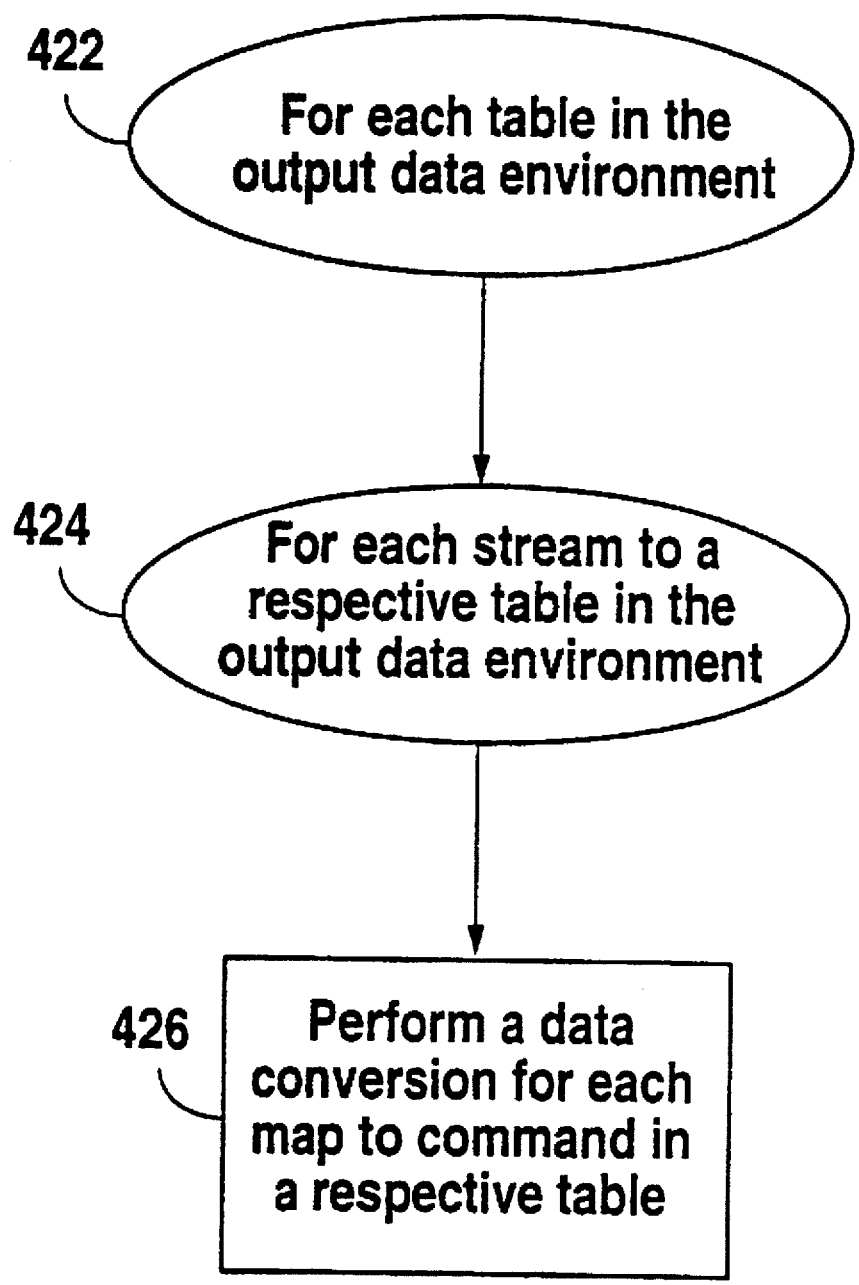
FIG. 7 illustrates execution of associations or MapTo commands to produce converted output data.

Referring now to FIG. 7, a more detailed flowchart diagram illustrating the steps performed in step 216 on FIG. 3 is shown. Execution of the MapTo commands in step 216 comprises, for each table in the output data environment and for each stream to a respective table in the output data environment performing a data conversion for each of the MapTo commands pointing to the respective output table for all of the streams to the respective output table as shown in steps 422-426.

Object Descriptions

Figure 8:
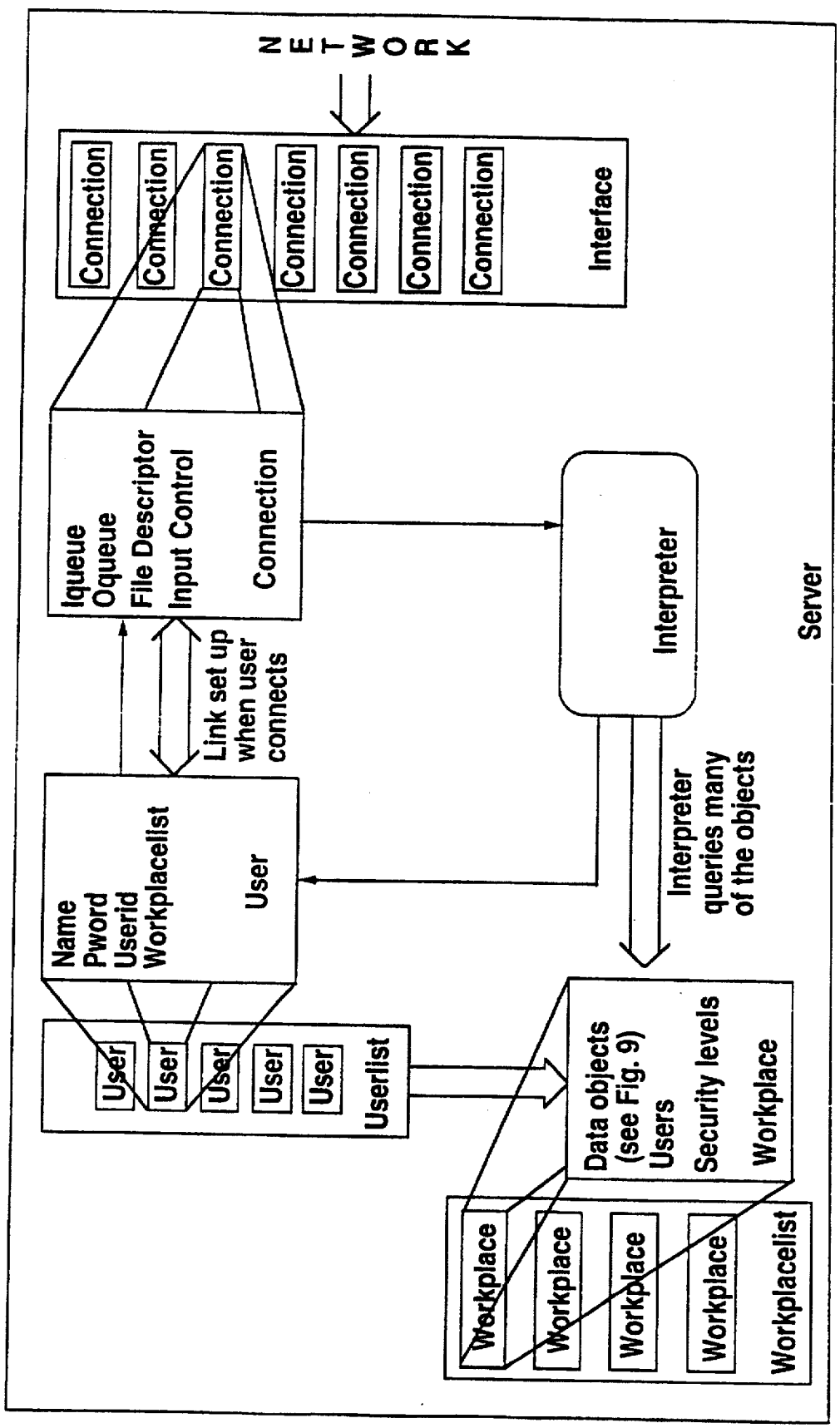
FIG. 8 illustrates generally the objects in the data conversion system and method.

The data conversion system and method comprises a plurality of software objects executing on the computer system 22 of FIG. 1. These objects are shown generally in FIGS. 8 and 9. Referring now to FIG. 8, the data conversion system and method includes a Server object which is an instance of the data conversion program. The data conversion system further includes a Userlist object comprising a linked list of all User objects, and an Interface object comprising a list of all Connection objects. The data conversion system further includes a Workplacelist object comprising a linked list of all Workplace objects. The objects comprised in the Workplace object are shown generally in FIG. 9 in the context of mapping from an input environment to an output environment.

Figure 9:
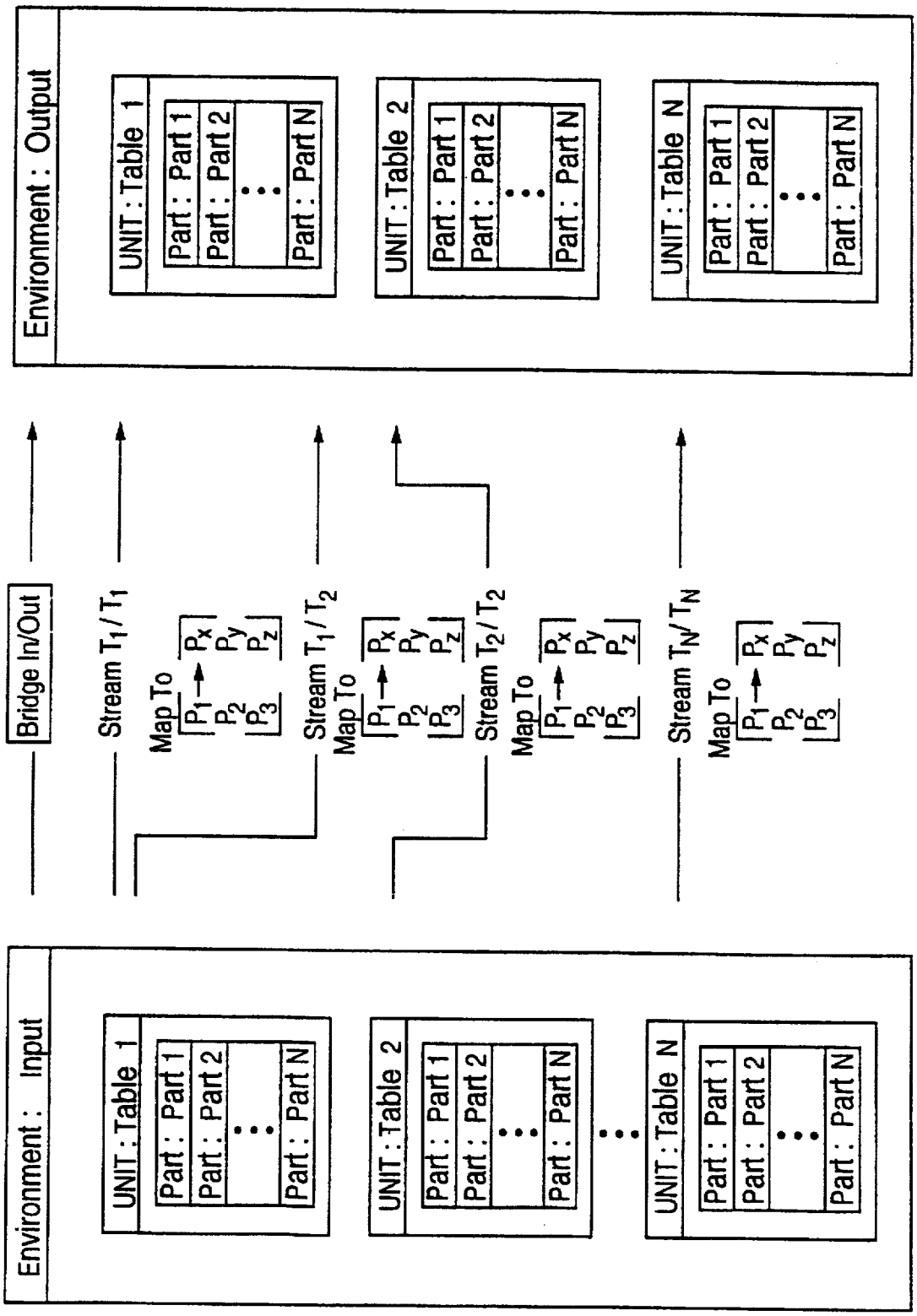
FIG. 9 illustrates mapping from an input environment to an output environment and also illustrates objects comprised in the Workplace object of FIG. 8.

As shown in FIG. 9, the Workplace object includes environment, unit and part objects, as well as bridge and stream objects, among others. The various objects comprised in the data conversion system are described below.

Server. The server object is an instance of the entire data conversion program and is "at the top" of the object hierarchy. The server allows a user to call or invoke the entire program to bind to a single port. Thus if the user desired that one copy of a program run on three separate ports, each having its own isolated workplaces, user entry and user list, this can be accomplished within a single execution of the program running three different times. Thus the entire program itself comprises a large object.

Interface. The interface object connects to the socket which allows users to log in and connect to the data conversion system. The interface object also allows for multi-user connectivity. An analogy can be made to a house where, if the server itself is a plot of land with the house on it, the interface is the front door, or more closely is akin to a butler that constantly listens for new people arriving at the house.

Connection. Whenever a new person connects to the data conversion system and method, a new connection object is created. In the analogy above, a connection is created every time a single user comes in and knocks on the door.

User. The user object is similar to the connection object except that the user actually has permission, i.e., the user actually has a name, a password and possibly other information that allows the user object access to the data conversion system. In contrast, a connection is simply a raw connection within the interface.

Workplace. The workplace is where the "work" is performed, i.e., where the environments are created. Everything pertaining to a conversion is comprised within a single workplace, including environments, tables, and parts as well as streams, bridges, and MapTo's. In the analogy above, the workplace is the room that a person works within. Thus if a first user is working in one workplace and a second user is working in a second different workplace, the first and second users do not see each others information and cannot work on the same data conversion. It is noted that a user can be moved into a new workplace to work on a common data conversion, and that environments can be cloned for passing into other workplaces.

Userlist. Workplacelist. Two objects referred to as Userlist and Workplacelist are used internally as commands to determine the current users and workplaces. Userlist is simply a linked list of all the users on line, i.e., a linked list of user objects. The workplace list object comprises a linked list of all currently opened workplaces.

Environment. The environment object refers to the respective data, i.e., to input data, output data, or any intermediate data. More specifically, the term "environment" refers to a collection of tables normally from a single data store or application that are grouped together in a single file.

Unit. The unit object comprises a plurality of records of data wherein each unit or table has a different record format. A table or unit object can be defined as a collection of like records, i.e., a collection of records of like type. One example of a table would be an employee's name, social security number, salary, date of birth, etc.

Part. The part object comprises the actual interworkings of a record, i.e., the type, the size, and the format of a respective record. In the example described above, the parts of the above employee data record would be the name field, the social security number field, the salary field, the date of birth field, etc.

Bridge. The bridge object comprises a logical association between two environments. More specifically, a bridge object comprises pointers to two or more different environments.

Stream. The stream object comprises a logical association between unit objects within two or more environments connected by a bridge object.

Expression. An expression object is used internally for the MapTo command. A general MapTo command is more than a single object, but rather comprises a linked list of expression objects. In general, an expression object is a collection of pointers between parts in different environments. Thus, a bridge object comprises a pointer to two different environments. A stream object is a subset of a bridge object and includes pointers to the streams in the respective bridge object. The stream object includes pointers to the input and output tables, and the MapTo commands within a stream comprise a linked list of expressions. Each expression object includes a pointer on the input side and may include one or more constants and/or operators that performs either mathematical, logical, or conditional operations on the data. The data conversion system and method resolves each expression object when executing a MapTo command.

Format. The format object contains the formatting for inputting and outputting data. For example, the string (%4 b) indicates 4 bytes; the string (#%6 S~) indicates a constant number sign plus a 6 byte string followed by a tilde or return. This format is similar but not identical to standard data referencing used in the C programming language.

I/O Queue and InterruptQueue. The I/O queue object and the interrupt queue object are used in the multi-user engine of the data conversion system to provide a buffering system for each user. Thus if a user is typing a command from a remote location and the connection starts going slowly, the engine buffers one or more commands to enable the user to continue working and these commands are fed through later. Thus if the system lags or slows down and the user continues entering data, the data conversion system will not lose any of the user's commands or data.

Ordlist. The Ordlist object is a linked list template or object class. The data conversion system uses a plurality of linked lists, and thus the Ordlist object serves as a higher level object class for each of the linked lists. Many of the objects in the data conversion system are of type "linked list" or Ordlist. For example, the workplace list and the user list.

Member. The member object comprises a portion of the expression object and is used in the internal parsing of the MapTo command.

File Mgr. A user declares a file within the UNIX system by providing a filename and requesting a new instance of the file. The File Manager object allows a user to perform open, close, read, write, and other operations on a file object. The File Manager object comprises a linked list of all files.

File. The File object is used for reading the input and output data stores, and is also used for the introduction and the help screens where the user logs in.

String. The string object facilitates manipulations that are required for strings, including concatenating strings, reading strings, writing strings, performing string to string compares, string to strings compares assuming all uppercase, strings to strings compares assuming all lowercase, adding, subtracting, etc.

Gdata. The Gdata or the generic data object is a large object which embodies the pre-defined generic data type. The Gdata object performs conversions to and from the generic data type according to the present invention. Operator overwrites are included to enable the Gdata object to add strings to integers, integers to strings, is string greater than 5, etc. As discussed above, conversions are performed from the Gdata object to and from all the other defined objects. As new objects are received, for example, a new packing algorithm is necessary for a new data type, it is only necessary to create conversion code for conversions to and from the Gdata object, and it is unnecessary to specifically develop conversion code for and between each of the types of objects.

System Commands

The system commands used in the data conversion system and method are as follows:

| Shutdown | Clear | Syslog | Chmod |
|---|---|---|---|
| Dc | Goto | Clone | Pass |
| Rename | Version | Who | Finger |
| Whoami | Last | Passwd | Useradd |
| Userdel | Mkenv | Rmenv | Loadenv |
| Saveenv | Loadbridge | Savebridge | Loadwork |
| Addwk | Rmwk | Listwk | Mkunit |
| Rmunit | Mkpart | Rmpart | Mksubpart |
| Rmsubpart | Show | View | Msg |
| Send | Wall | Users | Log |
| Mapto | Execute | Rmmapto | Create |
| Move | Quit | | |

Command Definitions

Shutdown syntax: shutdown

This command allow the system administrator to instantly shutdown the DCLE process, killing any child processes without saving any of the conversion information. All connections to the engine are also instantly cut. The DCLE process does not reinitialize unless it is initialized again from Unix.

Clear syntax: clear

This command simply allows any user to clear his/her screen of old information.

Syslog syntax: syslog<on||off>

This command allows the systems administrator to toggle the system log on or off. This informs the engine whether or not to display certain system information to the administrator including connections, dc's, hangups, logins, logouts and executions. It is noted that, regardless of whether the system administrator has syslog on or off, the information is saved to a log file in Unix for later reference.

Chmod syntax: chmod<workplacename><username><new securitylevel>

This command allows the systems administrator or workgroup owner to change the security permissions for a given user in a given workplace. This command overrides a user's general security level to give or restrict access to sensitive information. If a * is used for <username> then this command globally assigns the security level to every user except the system administrator.

Dc syntax: dc <socketnum>

This command allows the system administrator to disconnect a user from his socket connection. For security purposes or for general maintenance it sometimes becomes necessary to remove a user from his connection to the DCLE.

Goto syntax: goto <workplacename>

This command allows a user to change workplaces within the DCLE work environment. For security reasons a user cannot simply access any given workplace unless his security level for that workplace allows it.

Clone syntax: clone <environname><newenvironname>

For purposes of sharing work, this command allows a user to make a copy of an environment including all units, parts, subparts, etc., but not including bridges and streams.

Pass syntax: pass <environname><destworkplace>

After an environment has been Cloned, this command allows the user to transfer the environment to another workplace so that other users can manipulate the environment.

Rename syntax: rename <environname><newenvironname> rename <env:unitname><env:newunitname>rename <env:unit:partname><env:unit:newpartname>

This command allows a user to change the name of an environment, unit, part, or subpart.

Version syntax: version

This command displays the current version number of the DCLE program.

Who syntax: who

This command allows a user to see who is logged on to the DCLE program. This command displays the name, workplace, and last command for every user that is logged on.

Finger syntax: finger <user>

This command allows a user to find out information about other users. This command shows a user's real name, workplaces owned, date and time of last login, date and time of account creation, and the last site from which the user logged in.

Whoami syntax: whoami

This command shows a user the account name of the connection he/she currently has open in the DCLE program.

Last syntax: last <user>

This command allows a user to see when another user last logged in to the DCLE program. This command displays the account name, time and date of last login, and the last site from which the user logged in.

Passwd syntax: passwd <user><newpassword><oldpassword>

This command allows a user or the system administrator to change a user's account password. A user can only change his/her own password and must enter his/her old password for security reasons. The system administrator can change any user's password and does not have to enter that user's old password.

Useradd syntax: <useradd><user><passwd><seclevel><users realname>

This command allows a system administrator to enable a new user account. The system administrator must provide the new user name, password, and security level. A new user defaults to the common workgroup. At the system administrator's discretion, the user's real name can be added to the account information. However, this field is completely optional.

Userdel syntax: userdel <user>

This command allows a system administrator to disable an existing user account. This does not clean out a user's workplaces or destroy his/her work. Any workplace owned by the disabled account is reassigned to the system administrator and no other security levels are changed on those workplaces.

Mkenv syntax: mkenv <envname>

This command allows a user to create a new environment. The new environment occurs within the user's current workplace and can be manipulated by any other user in that workplace.

Rmenv syntax: rmenv <envname>

This command allows a user to delete an existing environment. When an existing environment is deleted, all attached units and parts are also lost.

Loadenv syntax: loadenv <env.filename>

This command loads an existing environment into the DCLE program from Unix. All attached units, parts, and subunits are also loaded. An environment is loaded into whatever workplace the user is in at the time. Note: Multiple environment of the same name cannot be loaded at the same time.

Saveenv syntax: saveenv <envname><env.filename>

This command allows a user to save the current environment loaded in his workplace. The user must provide the name of the environment and a filename under which the environment is to be saved. All attached units and parts are also saved.

Loadbdg syntax: loadbdg <bridge.filename>

This command allows a user to load all existing bridges, streams, and mappings associated with a given environment into the DCLE program from Unix. All instances of conditional logic are also loaded. All bridges are loaded into whatever workplace the user is in at the time.

Savebdg syntax: savebdg <bridge><bridge.filename>

This command allows a user to save the current set of bridges currently in use in a given workplace. The user must provide the name of the bridge and a filename under which the bridge is to be saved. All streams, maptos, and instances of conditional logic associated with a given bridge are also saved.

Loadwork syntax: loadwork <workfile.name>

For the sake of convenience, this command allows a user to load an environment and bridges all at one time. This command is a combination of the loadbdg and loadenv commands and is simply used as a time saver.

Addwk syntax: addwk <work.filename><workfile.name>

This command allows users to include a new environment or bridge file to the existing workfile index. The next time the loadwork command is executed the new file is loaded. It is noted that the actual filename of the environment or bridge file must be used.

Rmwork syntax: rmwork <work.filename><workfile.name>

This command allows a user to remove an existing environment or bridge file from the workfile index. The next time the loadwork command is executed the removed file is not loaded. It is noted that the actual filename of the environment or bridge file must be used.

Listwk syntax: listwork <workfile.name>

This command simply allows the user to display what filenames are included in the workfile index.

Mkunit syntax: mkunit <env:unitname><unitformat>

This command allows a user to create a new unit within an existing environment. The user must specify which environment the unit is to be attached and the format of the unit, especially on the output environment. When a new unit is created it is added to the bottom of the list of all existing units.

Rmunit syntax: rmunit <env:unit>

This command allows a user to remove an existing unit from the list of units within a given environment. After a unit has been removed all other units are renumbered to prevent holes in the list. All existing parts and subunits attached to a unit are also lost.

Mkpart syntax: mkpart <env:unit:partname><dataformat><data type><bytelength>

This command allows the user to create a new part under an existing unit or subunit within the existing environment.

Rmpart syntax: rmpart <env:unit:(subunit):partname>

This command allows a the user to delete a part under an existing unit or subunit within the existing environment. All mappings associated with the part still remain, however all references to that part are removed.

Show syntax: show <env:unit:(subunit):part>

This command allows the user to display information about a given environment. The user provides the detail level he wants displayed within the environment. If only an environment name is provided the command shows all units and parts within the environment. If environment name, subunit, and part name are given then only the part is displayed.

View syntax: view <bridge:stream:mapto>

This command is similar to the show command and allows a user to display information about a given bridge down to the detail level provided. If only a bridge name is provided the command shows all streams and mapto within the bridge. If bridge name, stream and mapto are provided then only the mapto is displayed.

Msg syntax: msg <text>

This command allows the user to send messages to every other user within the user's respective workplace. The name of the sending user is given followed by the message.

Send syntax: send <user><text>

This command allows the user to send message to any user on the engine. Only the user specified receives the message and the name of the sending user is displayed along with the message.

Wall syntax: wall <text>

This command allows the system administrator to send a message to every user on the engine. This is extremely useful for making general announcements.

Users syntax: users

This command allows the system administrator to display information about every user logged into the DCLE process. Information displayed includes socket number, user name, workplace, time connected, and site called from.

Log syntax: log <on||off>

This command allows the users to toggle their log on or off. This simply tells the engine whether or not to display information to the user consisting of operations during an execution. The log is generally used for debugging purposes.

Mapto (MapTo)

syntax: mapto <from><where>

This command allows the user to create a link between parts for mapping purposes. After a mapto has been created the mapto command is attached to an existing stream within a bridge, and is given a virtual name. Any time after creation of the mapto command the user can refer to a mapto by streamname (i.e. <bridgename%streamname%maptoXX>).

For further information on the mapto command, please see the discussion on the mapto command structure above.

Execute syntax: execute <bridge:stream:mapto>

This command allows the user to initiate the data conversion process. The command executes the conversion down to the lowest detail level provided. In most cases, this is the entire bridge and all streams and maptos are executed. However, for purposes of debugging, the user may specify a given stream or mapto within a bridge to execute.

Rmmapto syntax: rmmapto <bridge:stream:mapto>

This command allows the user to delete a mapto within an existing stream. For purposes of this command a mapto may be referred to by its virtual name.

Create syntax: create bridge <bridgename><inenv><outenv>
create stream <bridge:streamname><inunit><outunit>
create stream <streamname><inenv:inunit><outenv:outunit>

This command allows the user to create a new bridge or create a stream within an existing bridge. When a new bridge is created, linking two environments, it is noted that a single input environment may have multiple outputs, but an output may have only one input. For easy reference the bridge name is often a combination of the source and destination environment names (i.e. environment 'input' and environment 'output' have bridge 'inout'). The creation of a stream is similar except that it creates a link between tables and is attached to an existing bridge.

Move syntax: move <envnum:unitnum><envnum:unitnum>move <envnum:unitnum:partnum><envnum:unitnum:partnum>

This command allows the user to reshuffle the order of units, subunits, or parts within a given environment, or to go back and add a new unit, subunit or part to the list within an existing environment. Since pieces are read and written in the order they are created this command allows for easy manipulation Quit syntax: quit This command logs a user off the DCLE process and closes his/her connection to the server. None of the user's work is saved and the time of logout is logged.

EXAMPLE MIGRATION PROJECT

The following illustrates a simple example data conversion problem and illustrates the general design and commands necessary to use the data conversion system and method of the present invention. The following example, it is assumed that the physical origination and destination of the information is irrelevant. A common data conversion involves converting data from a mainframe hierarchical database to one or more relational database systems. However, for the purpose of this example, the example assumes a flat file to flat file conversion and that the platforms on either end of the conversion have no bearing on the conversion itself.

| Input Side | | Output Side |
|---|---|---|
| 2 Tables, | | 3 Output Tables |
| | Customer-1 | Out-Customer-1 |
| | Customer-2 | Out-Customer-2A |
| | | Out-Customer-2B |

The Table Definitions are as follows:

| Input Tables | Output Tables |
|---|---|
| name: Customer 1 | name: Out Customer 1 |
| fields: Name | {Name |
| Soc. Sec. Num. | Soc. Sec. Num. |
| Sex | Sex |
| Sales | New - Sales |
| name: Customer 2 | name: Out Customer 2A |
| fields: Name | fields: Name |
| Soc. Sec. Num. | Soc. Sec. Num. |
| Sex | Sex |
| Sales | New__Sales |
| | name: Out Customer 2B |
| | fields: Name |
| | Soc. Sec. Num. |
| | Sex |

In order to make use of every possible table-to-table relationship (one-to-one, one-to-many, many-to-one, many-to-many) we shall create a third, intermediate environment through which the data will be transferred in order to reach our destination (output) environment.

The Intermediate Environment

3 Tables

Fem-Customer-1

Male-Customer-1

Customer-2-Temp

The Table definitions are as follows:

Intermediates name: Fem__Customer__1 fields: Name Soc. Sec. Num. Sales name: Male__Customer__1 fields: Name Soc. Sec. Num. Sales name: Customer__2__Temp fields: Name Soc. Sec. Num. Sex Sales The relationships, input to intermediate to output, will be:

| In: | Customer-1 | (one to many) | Fem-Customer-1 |
|---|---|---|---|
| | | | Male-Customer-1 |
| | Customer-2 | (many-to many) | Customer-2-Temp |
| Inter: | Fem-Customer- 1 | (many-to-one) | Out-Customer-1 |
| | Male-Customer-1 | | |
| | Customer-2-Temp | (one-to-many) | Out-Customer-2A |
| | | | Out-Customer-2B |
| Out: | Out-Customer-1 | | |
| | Out-Customer-2A | | |
| | Out-Customer-2B | | |

-continued

THE NECESSARY MAPPINGS WOULD BE AS FOLLOWS:

Environment
Bridge:     Input to Intermediate

1 Stream: Customer_1 to Fem_Customer_1      {Put all female
                                             mobs into the
  1 Maps:   Name ->       Name
            SSNum ->      SSNum
            Sales ->      Sales
  Conds:    (Sex == "female")
2 Stream: Customer_1 to Male-Customer_1     {Put all male
                                             customers into
  1 Maps:   Name ->       Name
            SSNum ->      SSNum
            Sales ->      Sales
  Conds:    (Sex == "male")
1 Stream: Customer_2 to Customer_2_Temp     {If a customer is
                                             female, set
                                             intermediate sales
                                             to double the
                                             original amount }
  1 Maps:   Name ->       Name
            SSNum ->      SSNum
            Sex ->        Sex
            Sales*2 ->    Sales
  Conds:    (Sex == "female")
  2Maps     (ALL) ->      (ALL)             {If not female,
  Conds:    (Sex! = "Female")                map straight
Environment
Bridge:     Intermediate to Output 1 Stream: Fem_Cust_1 to Out_Customer_1      {Put all female
                                             customers
  1 Maps:   Name ->       Name
            SSNum ->      SSNum
            Sales ->      Sales
            "Female" ->   Sex
  Conds:    (Sex == "female")
2 Stream: Male_Cust_1 to Out_Customer_1     {Put all male
                                             customers into
  1 Maps:   Name ->       Name
            SSNum ->      SSNum
            Sales ->      Sales
            "Male" ->     Sex
  Conds:    (Sex == "male")
3 Stream: Customer_2_Temp to Out_Cust_2_2A  {If customer sales
                                             are >= 100,000
                                             then parse them
                                             out into a separate
                                             (2A) table}
  1 Maps:   Name ->       Name
            SSNum ->      SSNum -continued Sex ->        Sex
            Sales ->      Sales
  Conds:    (Sales >= 100,000)
4 Stream: Customer_2_Temp to Out_Cust_2B    {Master output
                                             table for
                                             in:customer_2,
                                             contains all
                                             records}
  1Maps     (ALL) ->      (ALL)
  Conds:    (None)

THE NECESSARY COMMANDS FOR THESE MAPPINGS

Commands for Mapping and Execution create bridge input intermediate
    create stream input.customer_1 intermediate.fem_customer_1
        MapTo (intermediate.fem_customer_1_:name, ssnum, sales)
        from (input.customer_1:              name, ssnum, sales)
        where (sex = "female")
    create stream input.customer_1 intermediate.male_customer_1
        MapTo (intermediate.male_customer_1_:name, ssnum, sales)
        from (input.customer_1:              name, ssnum, sales)
        where (sex = "male")
    create stream input.customer_2 intermediate.customer_2_temp
        MapTo (intermediate.customer_2_name, ssnum, sales)
        from (input.customer_2:              name, ssnum, sales*2)
        where (sex = "female")
        MapTo (intermediate.customer_2_temp:*)
        from (input.customer_2:              *)
        where (sex! = "female")
create bridge intermediate output
    create stream intermediate.fem_customer_1 output.out_customer_1
        MapTo (output.out_customer_1:        name, ssnum, sales, sex)
        from (intermediate.fem_customer_1:   name, ssnum, sales,
                                             "Female")
        where
    create stream intermediate.male_customer_1
    output.out_customer_1
        MapTo (output.out_customer_1:        name, ssnum, sales, sex)
        from (intermediate.fem_customer_1:   name, ssnum, sales,
                                             "Male")
        where
    create stream intermediate.customer_2_temp
    output.out_customer_2a
        MapTo (output.out_customer_2a:       name, ssnum, sex, sales)
        from (intermediate.customer_2_temp:  name, ssnum, sex, sales)
        where sales >= 100,000)
    create stream intermediate.customer_2_temp
    output.out_customer_2b
        MapTo (output.out_customer_2b:       name, ssnum, sex, sales)
        from (output.out_customer_temp:      name, ssnum, sex, sales)
        where
execute input intermediate
execute intermediate output Gdata Object Source Code Listing The following pages comprise a source code listing of the Gdata object to further describe the Gdata object as well as mappings to and from the Gdata object.

```
/* Generic Data Class (data.c) class gdata definitions.. */ ifndef DATA_H
define DATA_H include <stdio.h> const int NOTHING       =   -1;
    const int STRING        =   0;
    const int INTEGER       =   1;
    const int FLOAT         =   2;
    const int CHAR          =   3;
    const int REFERENCE     =   6;      // Reference to another data object = ;

const int ERR_TYPE      =   -1;

const int EQUAL         =   1;
    const int LESS          =   2;
    const into GRTR         =   4;

const char trueval      =   'T';
    const char falseval     =   'F'
```

```
class gdata
{
private:
        int gd_type;              // Type of data int gd_length;            // Length of the string used to store the data char *gd_refcount;        // The structure of the is kinda strange, but
        char *gd_valid;           // was necessary- it is an array of char, in the
        char *gd_data;
        // following format:
        //        | refcount | valid | Actual data.... |
        // byte:     0         1       2....gd_length+2
        //        *gd_refcount *gd_valid *gd_data
        // This mostly takes care of it when you make a
        // Expression reference to a part, then delete the
        // part.. cleanup stuff mostly.  Since it is opaque
        // all is handled in the function implementation.
        // valid = 0 no ref, valid = 1 ref, valid = -1
            // resized ref gdata *gd_ref;            //Reference for TYPE_REFERENCE void gd_init();           // Initializes a new data object, regardless of
                                  // whether something was already there or not.
        void gd_erase(int valid); //called by destructor, sets valid.
        void gd_resize(int newsize); // resize data - internal use
        int gd_comp(gdata &in1);// generic compare
```

```
public:
    gdata &gd_deref();          // find what reference points to
    gdata(int type = 0);        // Create a new object of 'type'. STRING is default.
    gdata(gdata &in);           // Copy constructor
    ~gdata();                   // Junk object.

void operator = (gdata &in); //assignment
    void operator = (int number);
    void operator = (char *instr);
    void operator = (char ch);
    void operator = (float flt);
    void operator &= (gdata &in);  // Reference assignment
    gdata &opeq (gdata *in1);
    gdata &opne (gdata *in1);
    gdata &oplt (gdata *in1);
    gdata &opgt (gdata *in1);
    gdata &ople (gdata *in1);
    gdata &opge (gdata *in1);
    gdata &opmpy (gdata *in1);
    gdata &opadd (gdata *in1);
    gdata &opsub (gdata *in1);
    int istrue( );
    void settype(int type) {gd_type = type;};    // For the readin
    void print ( ) {
            if (gd_type != REFERENCE)
                    printf("[%s] [%d][%d]\n", gd_data, gd_length, gd_type);
            else {
                    printf("*"); gd_deref( ).print( ); }
    };      // Debugging tool
```

```
        };

5      #endif

10
        #include <stdlib.h>
        #include <string.h>
        #include "data.h"

15      gdata::gdata(int type)
        {
                gd_type = type;
                gd_refcount = NULL;
                gd_init( );
20      } gdata::~gdata( )
        {
                gd_erase(0);
25      } gdata::gdata(gdata &in)
        {
                gd_type = in.gd_type;
```

```
if (in.gd_type !=     REFERENCE)
{
        int count:
        gd_resize(in.gd_length);
        for (count = 0; count <= gd_length + 2; count++)
                gd_refcount[count] = in.gd_refcount[count];
        gd_valid = gd_refcount + 1;
        gd_data = gd_refcount + 2;
        gd_ref= NULL;
}
else
{
        gd_ref = in.gd_ref;
        gd_refcount = in.gd_refcount;
        (*gd_refcount)++;
}
} void gdata::gd_erase(int validity)
{
        if(gd_refcount != NULL)
        {
        if (gd_refcount != REFERENCE)
                *gd_valid = validity;   // References to this object are now invalid.
        (*gd_refcount)--;               // Decrement reference count
        if (*gd_refcount == 0)          // If only reference, delete it
                delete gd_refcount;
        }
}
```

```
void gdata::dg_init( )
{
        gd_erase(0);

gd_ref = NULL;

if (gd_type != REFERENCE)
                {
                gd_refcount = new char[4];
                gd_valid = gd_refcount + 1;
                gd_data = gd_refcount + 2;

gd_length = 0;
                *gd_refcount + 1;
                *gd_valid = 1;
                *gd_data = 0;
                *(gd_data + 1) = 0;

switch (gd_type)
                        {
                        case INTEGER:
                        case FLOAT:
                                *gd_data = '0';
                                gd_length = 1;
                                break;
                        case CHAR:
                        case STRING:
                                break;
```

```
                };
        }
        else
        {
                gd_refcount =NULL
                gd_length = 0;
        }
} void gdata::gd_resize(int newsize)
{
        if (newsize <= gd_length)
        {
                gd_length = newsize;
                gd_data[gd_length] = 0;
                return;
        }
        if (gd_refcount == NULL)
                gd_init( );

int count;
        char *newdata;
        newdata = new char[newsize+3];
        for (count = 0; count <=gd_length + 2; count++)
                newdata[count] = gd_refcount[count];
        gd_erase(-1);
        gd_refcount = newdata;
        gd_valid = gd_refcount + 1;
        gd_data = gd_refcount + 2;
```

```
                gd_length = newsize;
        } void gdata::operator = (gdata &in)
5       {
                gd_type = in.gd_type;
                if (in.gd_type != REFERENCE)
                        {
                                int count;
10                              gd_resize(in.gd_length);
                                for (count = 0; count <=gd_length + 2; count ++)
                                        gd_refcount[count] = in.gd_refcount[count];
                                gd_ref = NULL;
                        }
15      else
                {
                gd_ref = in.gd_ref;
                gd_refcount = in.gd_refcount;
                (*gd_refcount)++;
20              }
        }
        void gdata::operator = (int number)
        {
                char buffer[1000];
25              sprintf(buffer, "%d", number);
                (*this) = buffer;
                gd_type = INTEGER;
        }
        void gdata::operator = (char *str)
```

```
            case FLOAT:
                    tmp = strchr(in1.gd_data, '.' );
                    if (tmp == NULL)
                            dist2 = in1.gd_length;
                    else
                            dist2 = (tmp - in1. gd_data);
        }
        if (dist1 > dist2) return GRTR;
        if (dist1 < dist2) return LESS;
        for (count = 0; count < gd_length; count++)
                if (gd_data[count] > in1.gd_data[count])
                        return GRTR;
                else if (gd_data[count] < in1.gd_data[count])
                        return LESS;
        if (gd_length == in1.gd_length)
                return EQUAL;
        return LESS;
}
gdata &gdata::gd_deref( )
{
        gdata *error;

if (gd_type != REFERENCE)
                {
                error = new gdata;
                return (*error);
                }
        if ((*gd_valid) ==0)
        {
```

```
        {
                int len = strlen(str);
                int count;
                gd_resize(len);
                gd_type = STRING;
                for (count = 0; count <= len; count++)
                        gd_data[count] = str[count];
        }
        void gdata::operator = (float number);
        {
                char tempstr[128];
                sprintf(tempstr, "%f", number);
                (*this) = tempstr;
                        gd_type = FLOAT;
        }
        void gdata::operator = (char ch)
        {
                gd_resize(1);
                gd_type = CHAR;
                gd_data[0] = ch;
                gd_data[1] = 0;
        }
        int gdata::dg_comp(gdata &in1)
        {
                int dist1, dist2;
                int count;
                char *tmp;

if (gd_type == REFERENCE)
```

```
                return (gd_deref( ).gd_comp(in1));
        if (in1.gd_type == REFERENCE)
                return (gd_comp(in1.gd_deref( )));

5       if (gd_type != in1.gd_type)
                return ERR_TYPE;

switch (gd_type)
                {
10              case STRING:
                case CHAR:
                        dist1 = gd_length;
                        break;
                case FLOAT:
15                      tmp = strchr(gd_data, ".");
                        if (tmp == NULL)
                                dist1 = gd_length;
                        else
                                dist1 = (tmp - gd_data);
20              }
        switch (in1.gd_type)
                {
                case STRING:
                case CHAR:
25                      dist2 = 0;
                        break;
                case: INTEGER:
                        dist2 = in1.gd_length;
                        break;
```

```
                error = new gdata;
                (*this) &= (*error);
                return (*error);
        }
        if ((*gd_valid) == -1)
        {
                gd_erase(0);
                gd_valid = gd_ref->gd_valid;
        } return (*gd_ref);
} void gdata::operator &=(gdata &in)
{
        gd_erase(0);
        gd_valid = in.gd_valid;
        gd_type = REFERENCE;
        gd_ref = ∈
}
int gdata::istrue( )
{
        IF ((*gd_data == 'T';) && (gd_length =1))
                return 1;
        return 0;

} gdata &gdta::opeq(gdata*in1)
```

```
        {
                gdata *nw;

nw = new gdata;

if (gd_comp(*in1) == EQUAL)
                        (*nw) = trueval;
                else
                        (*nw) = falseval;
                return (*nw);
        } gdata &gdata::opne(gdata *in1)
        {
                gdata *nw;

nw = new gdata;

if (gd_comp(*in1) == EQUAL)
                        (*nw) = falseval;
                else
                        (*nw) = trueval;
                return (*nw);
        } gdata &gdata::oplt(gdata *in1)
        {
                gdata *nw;
```

```
                nw = new gdata;

if (gd_comp(*in1) ==LESS)
                        (*nw) = trueval;
5               else
                        (*nw) = falseval;
                return (*nw);
        }

10      gdata &gdata::opgt(gdata *in1)
        {
                gdata *nw;

nw = new gdata;
15
                if (gd_comp(*in1) == GRTR)
                        (*nw) = trueval;
                else
                        (*nw) = falseval;
20              return (*nw);
        } gdata &gdata::ople(gdata *in1)
        {
25              gdata *nw;

nw = new gdata;

if (gd_comp(*in1) & (LESS | EQUAL))
```

```
                (*nw) = trueval;
        else
                (*nw) = falseval;
        return (*nw);
}
gdata &gdata::opge(gdata *in1)
{
        gdata *nw;

nw = new gdata;

if (gd_comp(*in1) & GRTR | EQUAL))
                (*nw) = trueval;
        else
                (*nw) = falseval;
        return (*nw);
} gdata &gdata::opmpy(gdata *in1)
{
        float temp1, temp2;
        int temp3, temp4;
        gdata *nw;
        nw = new gdata;

if ((gd_type == FLOAT) || (in1->gd_type ==FLOAT))
                {
                        temp1 = atof(gd_data);
                        temp2 = atof(in1->gd_data);
```

```
                    *nw = (float) temp1 * temp2;
            }
    else if ((gd_type ==INTEGER) || (in1->gd_type == INTEGER))
            {
                    temp3 = atoi(gd_data);
                    temp4 = atoi(in1->gd_data);
                    *nw = (int) temp 3 * temp 4;
            }
            else
                    *nw = 0;
            return (*nw);
            }
    gdata &gdata::opadd(gdata *in1)
    {
            float temp1, temp2;
            int temp3, temp4;
            gdata *nw;
            nw = new gdata;

if ((gd_type == FLOAT) || (in1 ->gd_type ==FLOAT))
            {
                    temp1 = atof(gd_data);
                    temp2 = atof(in1->gd_data);
                    *nw = (float) temp1 + temp2;
            }
    else if ((gd_type ==INTEGER) || (in1->gd_type == INTEGER))
            {
                    temp3 = atoi(gd_data);
                    temp4 = atoi(in1->gd_data);
```

```
                *nw = (int) temp3 + temp4;
        }
    else
        *new = 0;
    return (*nw);
    }
    gdata &gdata::opsub(gdata *in1)
    {
        float temp1, temp2;
        int temp3, temp4;
        gdata *nw;
        nw = new gdata;

if ((gd_type == FLOAT) || (in1->gd_type == FLOAT))
        {
                temp1 = atof(gd_data);
                temp2 = atof(in1->gd_ddata);
                *nw = (float) temp1- temp2;
        }
        else if ((gd_type == INTEGER) | (in1->gd_type == INTEGER))
        {
                temp3 = atoi(gd_data);
                temp4 = atoi(in1->gd_data);
                *nw = (int) temp3 - temp4;
        }
        else
                *nw = 0;
        return (*nw);
    }
```

Conclusion

Therefore, the present invention comprises a data conversion system and method which is used to convert data between different formats. The present invention may be used to convert data between any of various types of formats. The present invention uses a pre-defined generic data type object (Gdata), and other data types are converted to and from the Gdata object to simplify the migration process.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for converting data from an input data environment using a first data format to an output data environment using a second data format, wherein the input data environment includes one or more tables, each of the one or more tables in the input data environment having records including one or more fields, wherein the output data environment includes one or more tables, each of the one or more tables in the output data environment having records including one or more fields, the method comprising the steps of:

receiving a definition of the first data format;
   receiving a definition of the second data format;
   creating a logical association between the input data environment and the output data environment;
   creating one or more logical associations between the one or more tables in the input data environment and the one or more tables in the output data environment;
   creating one or more associations between the one or more fields in the one or more tables in the input data environment and the one or more fields in the one or more tables in the output data environment;
   performing a data conversion between the input data environment and the output data environment, wherein said performing comprises:
   accessing the data from the input data environment;
   converting the data from the input data environment using the first data format to data having a pre-defined generic format; and
   executing the associations between the one or more fields in the one or more tables in the input data environment and the one or more fields in the one or more tables in the output data environment, wherein said step of executing converts said data having said pre-defined generic format to output data having said second data format.

2. The method of claim 1, wherein said step of executing comprises:

for each table in the output data environment, for each of said logical associations between the one or more tables in the input data environment and a respective table in the output data environment, performing a data conversion for each of the associations between the one or more fields in the one or more tables in the input data environment and the one or more fields in the respective table in the output data environment.

3. The method of claim 1, wherein said step of executing comprises:

performing a data conversion for each of the associations between the one or more fields in one or more of the one or more tables in the input data environment and the one or more fields in a respective table in the output data environment;
   wherein said step of performing is performed for each of said logical associations between said one or more of the one or more tables in the input data environment and said respective table in the output data environment;
   wherein said step of performing is performed for each of said tables in said output data environment.

4. The method of claim 3, wherein the one or more tables in the output data environment have an order including a first table and a last table;

wherein said step of performing is performed for each of said tables in said output data environment according to said order of the one or more tables in the output data environment beginning with said first table in the output data environment and ending with said last table in the output data environment.

5. The method of claim 3, wherein the one or more tables in the input data environment include an order including a first table and a last table;

wherein said step of performing is performed for each of said logical associations between said one or more of the one or more tables in the input data environment and said respective table in the output data environment according to said order of the one or more tables in the input data environment beginning with said first table in the input data environment and ending with said last table in the input data environment.

6. The method of claim 1, wherein said data from the input data environment comprises a data portion and a type portion, wherein said step of converting the data from the input data environment using the first data format to said data having said pre-defined generic format comprises:

storing said data portion of said data from the input data environment in a first memory field; and
   storing said type portion of said data from the first input data environment in a second memory field.

7. The method of claim 6, further comprising:

creating an instance of a generic data object prior to said steps of storing said data portion and storing said type portion.

8. The method of claim 1, wherein said pre-defined generic format comprises a pre-defined generic data type, and wherein said step of converting the data from the input data environment using the first data format to data having a pre-defined generic format comprises converting the data from the input data environment using the first data format to data having said pre-defined generic data type.

9. The method of claim 1, wherein said step of creating said one or more associations between the one or more fields in the one or more tables in the input data environment and the one or more fields in the one or more tables in the output data environment comprises:

creating one or more mathematical associations between the one or more fields in the one or more tables in the input data environment and the one or more fields in the one or more tables in the output data environment;
   wherein said step of executing comprises executing said one or more mathematical associations between the one or more fields in the one or more tables in the input data environment and the one or more fields in the one or more tables in the output data environment.

10. The method of claim 1, wherein said step of creating said one or more associations between the one or more fields in the one or more tables in the input data environment and the one or more fields in the one or more tables in the output data environment comprises:

creating one or more logical associations between the one or more fields in the one or more tables in the input data environment and the one or more fields in the one or more tables in the output data environment;

wherein said step of executing comprises executing said one or more logical associations between the one or more fields in the one or more tables in the input data environment and the one or more fields in the one or more tables in the output data environment.

11. The method of claim 1, wherein said step of creating said one or more associations between the one or more fields in the one or more tables in the input data environment and the one or more fields in the one or more tables in the output data environment comprises:

creating one or more conditional associations between the one or more fields in the one or more tables in the input data environment and the one or more fields in the one or more tables in the output data environment;

wherein said step of executing comprises executing said one or more conditional associations between the one or more fields in the one or more tables in the input data environment and the one or more fields in the one or more tables in the output data environment.

12. The method of claim 1, wherein the data in the input data environment using said first data format comprises data having one or more different data types; and wherein the data in the output data environment using said second data format comprises data having one or more different data types.

13. The method of claim 1, further comprising:

storing said output data having said second data format in said output data environment after said step of executing.

14. The method of claim 13, wherein the input data environment comprises a first storage media storing the input data according to the first data format, and wherein the output data environment comprises a second storage media adapted to receive and store the output data according to the second data format;

wherein said step of accessing the input data comprises accessing the input data from the first storage media; and wherein said step of storing said converted output data having said second data format comprises writing said converted output data having said second data format to said second storage media.

15. The method of claim 1, wherein said step of receiving a definition of the first data format comprises:

receiving a user-specified definition of the first data format, including a definition of the one or more tables in the input environment and the one or more fields for each of said one or more tables.

16. The method of claim 1, wherein the input data environment includes a data dictionary defining said first data format;

wherein said step of receiving said definition of the first data format comprises:

receiving said data dictionary of the first data format; and converting said data dictionary of the first data format into said definition of the first data format.

17. The method of claim 1, wherein the one or more tables in the input data environment each comprise one or more records of like data type, wherein the one or more tables in the output data environment each comprise one or more records of like data type.

18. The method of claim 17, wherein said input data environment comprises a database and said output data environment comprises a database.

19. The method of claim 18, wherein said input data environment comprises a hierarchical database and said output data environment comprises a relational database.

20. The method of claim 1, wherein said step of creating an association between the one or more fields in the one or more tables in the input data environment and the one or more fields in the one or more tables in the output data environment comprises:

creating one or more MapTo commands between the one or more fields in the one or more tables in the input data environment and the one or more fields in the one or more tables in the output data environment.

21. A system for converting data from a first data format to a second data format, the system comprising:

a first storage medium for storing input data using a first data format, wherein the input data using the first data format includes one or more tables, each of the one or more tables in the input data having records including one or more fields;

a second medium for storing output data using a second data format, wherein the output data using the second data format includes one or more tables, each of the one or more tables in the output data having records including one or more fields;

an input data environment object which receives a definition of the first data format, wherein said definition of the first data format includes one or more tables each having one or more fields;

an output data environment object which receives a definition of the second data format, wherein said definition of the second data format includes one or more tables each having one or more fields;

a workplace object for storing one or more associations between the one or more fields in the one or more tables in the input data environment and the one or more fields in the one or more tables in the output data environment;

a generic data object for storing data using a pre-defined generic format, means for converting the data from the first input data environment using the first data format to data having said pre-defined generic format; and means for executing the associations between the one or more fields in the one or more tables in the input data environment and the one or more fields in the one or more tables in the output data environment, wherein said means for executing converts said data having said pre-defined generic format to output data having said second data format.

22. The method of claim 21, wherein said data from the first input data environment comprises a data portion and a type portion;

wherein said generic data object comprises a first memory field storing a data portion and a second memory field storing a type portion.

23. A method for converting data from an input data file using a first data format to an output data file using a second data format, wherein the input data file includes one or more tables, each of the one or more tables in the input data environment having records including one or more fields, wherein the output data file includes one or more tables, each of the one or more tables in the output data file having records including one or more fields, the method comprising the steps of:

receiving a definition of the first data format;

receiving a definition of the second data format;

creating a logical association link between the input data file and the output data file;

creating one or more logical association links between the one or more tables in the input data file and the one or more tables in the output data file;

creating one or more association links between the one or more fields in the one or more tables in the input data file and the one or more fields in the one or more tables in the output data file;

performing a data conversion between the input data file and the output data file, wherein said performing comprises:

accessing the data from the input data file;

converting the data from the input data file using the first data format to data having a pre-defined generic format; and executing the association links between the one or more fields in the one or more tables in the input data file and the one or more fields in the one or more tables in the output data file, wherein said step of executing converts said data having said pre-defined generic format to output data having said second data format.

24. A method for converting data from an input data file using a first data format to an output data file using a second data format, wherein the input data file includes one or more tables, each of the one or more tables in the input data file having records including one or more fields, wherein the output data file includes one or more tables, each of the one or more tables in the output data file having records including one or more fields, the method comprising the steps of:

creating an input environment link to the input data file;

receiving a definition of the first data format;

creating an output environment link to the output data file;

receiving a definition of the second data format;

creating a logical association between the input environment link and the output environment link;

creating one or more logical associations between the one or more tables in the input data file and the one or more tables in the output data file;

creating one or more associations between the one or more fields in the one or more tables in the input data file and the one or more fields in the one or more tables in the output data file;

performing a data conversion between the input data file and the output data file, wherein said performing comprises:

accessing the data from the input data file;

converting the data from the input data file using the first data format to data having a pre-defined genetic format; and executing the associations between the one or more fields in the one or more tables in the input data file and the one or more fields in the one or more tables in the output data file, wherein said step of executing converts said data having said pre-defined generic format to output data having said second data format.

25. A method for converting data from an input data environment using a first data format to an output data environment using a second data format, wherein the input data environment includes one or more tables, each of the one or more tables in the input data environment having records including one or more fields, wherein the output data environment includes one or more tables, each of the one or more tables in the output data environment having records including one or more fields, the method comprising the steps of:

receiving a definition of the first data format;

receiving a definition of the second data format;

creating a logical association between the input data environment and the output data environment;

creating one or more user-defined links between the one or more tables in the input data environment and the one or more tables in the output data environment, wherein said user-defined links are configured to link any one or more tables in the input data environment to any one or more tables in said output data environment;

creating one or more associations between the one or more fields in the one or more tables in the input data environment and the one or more fields in the one or more tables in the output data environment;

performing a data conversion between the input data environment and the output data environment, wherein said performing comprises:

accessing the data from the input data environment;

converting the data from the input data environment using the first data format to data having a pre-defined generic format; and executing the associations between the one or more fields in the one or more tables in the input data environment and the one or more fields in the one or more tables in the output data environment, wherein said step of executing converts said data having said pre-defined generic format to output data having said second data format.

* * * * *